US012589853B1

(12) United States Patent
Slocum et al.

(10) Patent No.: US 12,589,853 B1
(45) Date of Patent: Mar. 31, 2026

(54) ACTIVELY ACTUATABLE VALVES FOR AEROSTAT BUOYANCY CONTROL

(71) Applicant: LTAG SYSTEMS LLC, Bow, NH (US)

(72) Inventors: Jonathan T. Slocum, Bow, NH (US); Alexander H. Slocum, Bow, NH (US)

(73) Assignee: LTAG SYSTEMS LLC, Bow, NH (US)

( * ) Notice: Subject to any disclaimer, the term of this patent is extended or adjusted under 35 U.S.C. 154(b) by 0 days.

(21) Appl. No.: 18/537,779

(22) Filed: Dec. 12, 2023

Related U.S. Application Data

(60) Provisional application No. 63/432,025, filed on Dec. 12, 2022.

(51) Int. Cl.
B64B 1/64          (2006.01)
B64B 1/62          (2006.01)

(52) U.S. Cl.
CPC .   B64B 1/64 (2013.01); B64B 1/62 (2013.01)

(58) Field of Classification Search
CPC .... B64B 1/62; B64B 1/64; F16K 31/06–0675
See application file for complete search history.

(56) References Cited

U.S. PATENT DOCUMENTS

| 1,614,117 A | | 1/1927 | Geldhof |
| 2,384,720 A | | 9/1945 | Babcock et al. |
| 2,681,774 A | * | 6/1954 | Winzen ..................... B64B 1/40 |
| | | | 244/31 |

| 2,931,597 A | * | 4/1960 | Moore, Jr. ................ B64B 1/58 |
| | | | 244/97 |
| 3,014,689 A | | 12/1961 | Soderstrom |
| 3,117,424 A | | 1/1964 | Hebenstreit |

(Continued)

FOREIGN PATENT DOCUMENTS

| AU | 2003204345 A1 | * | 12/2003 | ............... B64B 1/40 |
| CA | 2800795 A1 | | 3/2013 | |

(Continued)

OTHER PUBLICATIONS

U.S. Patent and Trademark Office, "Final Office Action," issued in related U.S. Appl. No. 17/865,201 dated Aug. 26, 2024 (21 pages).

(Continued)

*Primary Examiner* — Joshua J Michener
*Assistant Examiner* — Michael B. Kreiner
(74) *Attorney, Agent, or Firm* — The Marbury Law Group, PLLC

(57)          ABSTRACT

According to one aspect, an aerostat may include an inflatable structure including a balloon and a neck collectively defining a volume, a valve including a funnel supportable in the neck and defining a first opening, a second opening, and a cavity therebetween, the cavity in fluid communication with the volume via the second opening, a stem defining a channel at least partially outside of the inflatable structure, a stopper disposed in the cavity, a rod coupled to the stopper and at least partially disposed in the channel, and an actuator electrically actuatable to move the rod relative to the channel such that the stopper moves relative to the first opening of the cavity to control fluid communication between the volume and the channel via the cavity.

18 Claims, 13 Drawing Sheets

(56)  References Cited

U.S. PATENT DOCUMENTS

| | | | |
|---|---|---|---|
| 3,118,465 A | | 1/1964 | Scaramucci |
| 3,216,466 A | * | 11/1965 | Simko ........................ B64B 1/62 |
| | | | 285/104 |
| 3,270,920 A | | 9/1966 | Nessler |
| 3,381,655 A | | 5/1968 | Rozzelle |
| 3,487,810 A | * | 1/1970 | Clement ................. G08B 5/002 |
| | | | 116/210 |
| 3,514,076 A | | 5/1970 | Wheatley |
| 3,554,707 A | | 1/1971 | Holmes |
| 3,652,054 A | * | 3/1972 | Layton ................ F16K 31/0651 |
| | | | 251/65 |
| 4,049,158 A | | 9/1977 | Lo |
| 4,084,771 A | | 4/1978 | Creuzet |
| 4,133,513 A | | 1/1979 | Meyer |
| 4,134,491 A | | 1/1979 | Turillon et al. |
| 4,264,018 A | | 4/1981 | Warren |
| 4,586,456 A | | 5/1986 | Forward |
| 4,944,242 A | | 7/1990 | Russell |
| 4,982,929 A | | 1/1991 | Spurling |
| 4,998,708 A | | 3/1991 | Pavanel |
| 5,137,179 A | | 8/1992 | Stoffel |
| 5,152,501 A | | 10/1992 | Raymond, Jr. |
| 5,240,449 A | | 8/1993 | Sloan et al. |
| 5,301,631 A | | 4/1994 | Vining |
| 5,454,292 A | * | 10/1995 | Oudelaar ............ F16K 31/0637 |
| | | | 91/446 |
| 5,456,492 A | | 10/1995 | Smith et al. |
| 5,533,751 A | | 7/1996 | Kort et al. |
| 5,555,839 A | | 9/1996 | Staten et al. |
| 5,605,481 A | | 2/1997 | Van Raden |
| 5,707,499 A | | 1/1998 | Joshi et al. |
| 5,732,752 A | | 3/1998 | Glessner et al. |
| 6,109,203 A | * | 8/2000 | Mears .................... B63C 9/0005 |
| | | | 116/210 |
| 6,386,137 B1 | | 5/2002 | Riche |
| 6,506,360 B1 | | 1/2003 | Andersen et al. |
| 7,344,267 B2 | | 3/2008 | Carito |
| 7,356,390 B2 | | 4/2008 | Knoblach et al. |
| 7,364,815 B2 | | 4/2008 | Nakagawa et al. |
| 7,503,277 B2 | | 3/2009 | Boschma, Jr. et al. |
| 7,540,892 B2 | | 6/2009 | Strizki et al. |
| 7,588,087 B2 | | 9/2009 | Cafferata |
| 7,666,386 B2 | | 2/2010 | Withers-Kirby et al. |
| 7,740,225 B1 | * | 6/2010 | Estelle ................ F16K 31/0665 |
| | | | 251/129.05 |
| 7,789,373 B2 | * | 9/2010 | Schulz ........................ F16K 1/36 |
| | | | 251/339 |
| 7,803,349 B1 | | 9/2010 | Muradov |
| 7,871,036 B2 | | 1/2011 | Zubrin et al. |
| 8,132,779 B2 | * | 3/2012 | Lee ..................... F16K 31/0662 |
| | | | 303/119.2 |
| 8,157,205 B2 | | 4/2012 | McWhirk |
| 8,161,996 B2 | | 4/2012 | Barker et al. |
| 8,333,362 B2 | * | 12/2012 | Busato .................. F16K 39/022 |
| | | | 251/129.17 |
| 8,418,435 B2 | | 4/2013 | Hatoum |
| 8,430,704 B2 | | 4/2013 | Jeffrey |
| 8,522,835 B2 | | 9/2013 | McLean |
| 8,579,158 B2 | | 11/2013 | Rice |
| 8,864,064 B2 | | 10/2014 | Dimarzio et al. |
| 8,974,765 B2 | | 3/2015 | Boyle et al. |
| 9,090,323 B1 | | 7/2015 | Ratner |
| 9,174,140 B2 | | 11/2015 | Nelson et al. |
| 9,346,532 B1 | | 5/2016 | Ratner |
| 9,366,355 B2 | * | 6/2016 | McFarland ......... F16K 31/0651 |
| 9,511,844 B1 | | 12/2016 | Devaul |
| 9,619,977 B2 | | 4/2017 | Graham et al. |
| 9,853,360 B2 | | 12/2017 | Sylvia et al. |
| 9,902,480 B1 | | 2/2018 | Cromie et al. |
| 10,113,534 B2 | | 10/2018 | Sia |
| 10,236,930 B1 | | 3/2019 | Ferraro |
| 10,364,136 B2 | * | 7/2019 | Newton ............... B67D 1/0034 |
| 10,556,709 B1 | | 2/2020 | Kimchi et al. |
| 10,737,754 B1 | | 8/2020 | Farley et al. |
| 10,745,789 B2 | | 8/2020 | Slocum |
| 10,787,268 B2 | | 9/2020 | Leidich et al. |
| 10,829,192 B1 | | 11/2020 | Farley et al. |
| 10,829,229 B2 | | 11/2020 | MacCallum et al. |
| 10,988,227 B2 | | 4/2021 | MacCallum et al. |
| 10,995,680 B2 | | 5/2021 | Tanaka et al. |
| 11,130,557 B1 | | 9/2021 | Slocum et al. |
| 11,141,671 B2 | | 10/2021 | Harter et al. |
| 11,142,318 B2 | | 10/2021 | Thrun et al. |
| 11,148,947 B1 | | 10/2021 | Slocum et al. |
| 11,203,430 B2 | | 12/2021 | Heppe |
| 11,312,466 B1 | | 4/2022 | Slocum et al. |
| 11,318,437 B1 | | 5/2022 | Slocum et al. |
| 11,414,170 B2 | * | 8/2022 | Anderson ............. F04D 25/084 |
| 11,661,339 B1 | | 5/2023 | Mahar et al. |
| 11,732,818 B2 | * | 8/2023 | Tanno ................. F16K 31/0672 |
| | | | 137/15.18 |
| 11,738,849 B1 | | 8/2023 | Slocum et al. |
| 11,964,748 B1 | | 4/2024 | Slocum et al. |
| 12,134,456 B1 | * | 11/2024 | Slocum .................... B64B 1/64 |
| 12,187,405 B1 | | 1/2025 | Slocum et al. |
| 12,296,940 B2 | | 5/2025 | Slocum et al. |
| 2002/0088178 A1 | | 7/2002 | Davis |
| 2003/0062444 A1 | | 4/2003 | Goodey |
| 2006/0278757 A1 | | 12/2006 | Kelleher |
| 2008/0193806 A1 | | 8/2008 | Kulakov |
| 2010/0038477 A1 | | 2/2010 | Kutzmann et al. |
| 2010/0112396 A1 | | 5/2010 | Goldstein |
| 2010/0200693 A1 | | 8/2010 | Zubrin et al. |
| 2010/0230121 A1 | | 9/2010 | Hall et al. |
| 2010/0276537 A1 | | 11/2010 | Kutzmann et al. |
| 2010/0288875 A1 | | 11/2010 | Barnes et al. |
| 2012/0052001 A1 | | 3/2012 | Woodall et al. |
| 2012/0100443 A1 | | 4/2012 | Braithwaite et al. |
| 2012/0107228 A1 | | 5/2012 | Ishida et al. |
| 2012/0223181 A1 | | 9/2012 | Ciampa |
| 2012/0318660 A1 | | 12/2012 | Cohly et al. |
| 2013/0004865 A1 | | 1/2013 | Stimits |
| 2013/0115544 A1 | | 5/2013 | Davidson et al. |
| 2013/0248748 A1 | | 9/2013 | Baumann |
| 2014/0097289 A1 | | 4/2014 | Heppe |
| 2014/0231281 A1 | | 8/2014 | Young et al. |
| 2014/0261132 A1 | | 9/2014 | Zeren et al. |
| 2015/0204486 A1 | | 7/2015 | Hoffmann |
| 2015/0258298 A1 | | 9/2015 | Satoh et al. |
| 2016/0207605 A1 | | 7/2016 | Jensen et al. |
| 2016/0257415 A1 | | 9/2016 | Ye et al. |
| 2016/0355918 A1 | | 12/2016 | Slocum |
| 2017/0022075 A1 | | 1/2017 | Ritchie et al. |
| 2017/0022078 A1 | | 1/2017 | Fukuoka |
| 2017/0203827 A1 | | 7/2017 | Marcum |
| 2017/0355460 A1 | | 12/2017 | Shannon et al. |
| 2017/0355462 A1 | | 12/2017 | Hoheisel |
| 2018/0237141 A1 | | 8/2018 | Heppe |
| 2018/0280743 A1 | | 10/2018 | Walker |
| 2019/0024216 A1 | | 1/2019 | Giri et al. |
| 2019/0077510 A1 | | 3/2019 | Panas et al. |
| 2019/0079509 A1 | | 3/2019 | Bosworth |
| 2019/0193913 A1 | | 6/2019 | Takehara |
| 2019/0341637 A1 | | 11/2019 | Fine et al. |
| 2020/0088178 A1 | | 3/2020 | Fukudome |
| 2020/0156790 A1 | | 5/2020 | Von Flotow et al. |
| 2020/0199727 A1 | | 6/2020 | Slocum |
| 2020/0199728 A1 | | 6/2020 | Slocum |
| 2020/0262536 A1 | | 8/2020 | Deakin |
| 2020/0325045 A1 | | 10/2020 | Fukuoka |
| 2021/0011492 A1 | | 1/2021 | Raabe et al. |
| 2021/0061488 A1 | | 3/2021 | Smithers et al. |
| 2021/0080010 A1 | | 3/2021 | Klein |
| 2021/0115547 A1 | | 4/2021 | Slocum |
| 2021/0237843 A1 | | 8/2021 | Slocum et al. |
| 2021/0276865 A1 | | 9/2021 | Meroueh |
| 2021/0276866 A1 | | 9/2021 | Meroueh |
| 2022/0041262 A1 | | 2/2022 | Slocum et al. |
| 2022/0074023 A1 | | 3/2022 | Godart |
| 2023/0002026 A1 | | 1/2023 | Limpaecher et al. |
| 2023/0150701 A1 | | 5/2023 | Yartha et al. |
| 2023/0159149 A1 | | 5/2023 | Slocum et al. |

(56) References Cited

U.S. PATENT DOCUMENTS

FOREIGN PATENT DOCUMENTS

| | | | |
|---|---|---|---|
| CN | 101198737 | A | 8/2011 |
| CN | 204034673 | U | 12/2014 |
| CN | 109678109 | A | 4/2019 |
| CN | 113124170 | A | 7/2021 |
| EP | 1975479 | A2 | 9/2009 |
| EP | 2980352 | B1 | 2/2023 |
| FR | 2914391 | A1 | 1/2012 |
| FR | 3057539 | A1 * | 4/2018 |
| GB | 2226619 | A | 7/1990 |
| GB | 2356184 | A | 5/2001 |
| GB | 2525372 | A | 10/2015 |
| JP | 2004243151 | A | 9/2004 |
| JP | 2004174301 | A | 9/2007 |
| WO | 2011040942 | A | 9/2007 |
| WO | 2009034479 | A2 | 3/2009 |
| WO | 2015005921 | A1 | 1/2015 |
| WO | 20150077225 | A1 | 5/2015 |
| WO | 2016196718 | A1 | 12/2016 |
| WO | 2021034805 | A1 | 2/2021 |
| WO | 2021119628 | A1 | 6/2021 |

OTHER PUBLICATIONS

U.S. Patent and Trademark Office, "Notice of Allowance and Fee(s) Due," issued in related U.S. Appl. No. 18/110,352 dated Jun. 20, 2024 (17 pages).

Godart, P., "Design of an Aluminum-Powered Reverse Osmosis Desalination System for Disaster Relief," Massachusetts Institute of Technology, Jun. 2019, Dept. of Mechanical Engineering, May 22, 2019 (105 pages).

Godart, P., "Mechanisms of Liquid-Metal-Activated Aluminum-Water Reactions and the Application," Massachusetts Institute of technology, Sep. 2021, Dept. of Mechanical Engineering, Aug. 6, 2021, (351 pages).

Wikipedia, "Uss Macon (ZRS-5)," Feb. 24, 2023 (10 pages).

The U.S. Patent and Trademark Office, "Notice of Allowance", issued in related U.S. Appl. No. 17/014,593, dated Jun. 3, 2021 (15 pages).

The U.S. Patent and Trademark Office, "Notice of Allowance", issued in related U.S. Appl. No. 17/014,593, dated Jan. 22, 2021 (19 pages).

The U.S. Patent and Trademark Office, "Restriction Requirement", issued in related U.S. Appl. No. 17/014,593, dated Dec. 8, 2020 (7 pages).

The U.S. Patent and Trademark Office, "Restriction Requirement", issued in related U.S. Appl. No. 17/233,781, dated Aug. 11, 2022 (5 pages).

The U.S. Patent and Trademark Office, "Non-Final Office Action", issued in related U.S. Appl. No. 17/233,781, dated Sep. 26, 2022 (24 pages).

The U.S. Patent and Trademark Office, "Final Office Action", issued in related U.S. Appl. No. 17/233,781, dated Apr. 3, 2023 (8 pages).

The U.S. Patent and Trademark Office, "Notice of Allowance", issued in related U.S. Appl. No. 18/346,683, dated Apr. 10, 2024 (11 pages).

The U.S. Patent and Trademark Office, "Notice of Allowance", issued in related U.S. Appl. No. 17/535,008 dated Dec. 8, 2022 (30 pages).

The U.S. Patent and Trademark Office, "Notice of Allowance", issued in related U.S. Appl. No. 17/535,008, dated Apr. 19, 2023 (14 pages).

The U.S. Patent and Trademark Office, "Notice of Allowance", issued in related U.S. Appl. No. 17/535,008 dated Aug. 11, 2023 (17 pages).

The U.S. Patent and Trademark Office, "Notice of Allowance", issued in related U.S. Appl. No. 17/535,008, dated Nov. 30, 2023 (14 pages).

The U.S. Patent and Trademark Office, "Notice of Allowance", issued in related U.S. Appl. No. 17/586,759, dated May 24, 2023 (26 pages).

The U.S. Patent and Trademark Office, "Restriction Requirement", issued in related U.S. Appl. No. 17/865,201, dated Sep. 12, 2022 (6 pages).

The U.S. Patent and Trademark Office, "Non-Final Office Action", issued in related U.S. Appl. No. 17/865,201, dated Nov. 25, 2022 (15 pages).

The U.S. Patent and Trademark Office, "Non-Final Office Action", issued in related U.S. Appl. No. 17/865,201, dated Jul. 3, 2023 (23 pages).

The U.S. Patent and Trademark Office, "Final Office Action", issued in related U.S. Appl. No. 17/865,201, dated Jan. 24, 2024 (10 pages).

The U.S. Patent and Trademark Office, "Non-Final Office Action", issued in related U.S. Appl. No. 17/967,818, dated Mar. 21, 2024 (33 pages).

The U.S. Patent and Trademark Office, "Notice of Allowance", issued in related U.S. Appl. No. 18/110,352, dated Mar. 13, 2024 (20 pages).

U.S. Patent and Trademark Office, "Notice of Allowance and Fee(s) Due," issued in related U.S. Appl. No. 18/346,683, dated Aug. 26, 2024 (14 pages).

U.S. Patent and Trademark Office, "Notice of Allowance and Fee(s) Due," issued in related U.S. Appl. No. 18/590,501 dated Feb. 20, 2025 (8 pages).

U.S. Patent and Trademark Office, "Notice of Allowance and Fee(s) Due," issued in related U.S. Appl. No. 18/590,501 dated Apr. 29, 2025 (8 pages).

U.S. Patent and Trademark Office, "Notice of Allowance and Issue Fee(s) Due," issued in related U.S. Appl. No. 17/586,759 dated Sep. 6, 2023 (15 pages).

U.S. Patent and Trademark Office, "Notice of Allowance and Fee(s) Due," issued in related U.S. Appl. No. 18/609,776 dated Mar. 26, 2025 (8 pages).

U.S. Patent and Trademark Office, "Notice of Allowance and Fee(s) Due," issued in related U.S. Appl. No. 17/967,818, dated Jan. 15, 2025 (33 pages).

U.S. Patent and Trademark Office, "Advisory Action," issued in U.S. Appl. No. 17/865,201, dated Apr. 22, 2024 (3 pages).

U.S. Patent and Trademark Office, "Final Office Action," issued in U.S. Appl. No. 17/865,201, dated Aug. 26, 2024 (21 pages).

* cited by examiner

DETAIL D

DETAIL B

DETAIL E

DETAIL C

DETAIL B

SECTION A-A

ACTIVELY ACTUATABLE VALVES FOR AEROSTAT BUOYANCY CONTROL

CROSS-REFERENCE TO RELATED APPLICATIONS

This application claims priority to U.S. Prov. App. Ser. No. 63/432,025, filed Dec. 12, 2022, the entire contents of which are hereby incorporated herein by reference.

BACKGROUND

Balloons can be filled with a lifting gas to allow the balloon to float in any one or more of various, different media. As an example, balloons in the form of weather balloons are commonly used for meteorological observation. Such weather balloons provide localized weather conditions that may not be accurately measurable using ground-based measurements or satellite images.

The types of applications in which balloons are useful are, however, constrained by the resources and quality of lifting gases required to impart buoyancy to balloons. That is, the time and equipment required for inflation can make balloons unsuitable for many implementations in the field, away from established infrastructure. Further, the performance of balloons can be significantly impacted by composition of the lifting gas itself, resulting in suboptimal—or at least unpredictable—flight of the balloon as composition of the lifting gas and/or environmental conditions change during the course of a given flight.

Accordingly, there remains a need for making balloon inflation and flight more robust across a variety of field conditions, while using equipment and resources amenable to transport and rapid deployment.

SUMMARY

According to one aspect, an aerostat may include an inflatable structure including a balloon and a neck collectively defining a volume, a valve including a funnel supportable in the neck and defining a first opening, a second opening, and a cavity therebetween, the cavity in fluid communication with the volume via the second opening, a stem defining a channel at least partially outside of the inflatable structure, a stopper disposed in the cavity, a rod coupled to the stopper and at least partially disposed in the channel, and an actuator electrically actuatable to move the rod relative to the channel such that the stopper moves relative to the first opening of the cavity to control fluid communication between the volume and the channel via the cavity.

In certain implementations, the valve may be normally-closed with the stopper restricting flow through the first opening of the cavity, and the actuator is electrically actuatable to move the stopper away from the first opening of the cavity to establish fluid communication between the volume of the inflatable structure and the channel of the stem via the cavity of the funnel.

In some implementations, with the actuator deactivated, the stopper may restrict fluid communication between the first opening and the volume of the inflatable structure via the second opening.

In certain implementations, the actuator may be electrically actuatable to generate electromagnetic energy directed to the rod to move the rod relative to the channel. For example, at least one portion of the rod may be formed of a ferromagnetic material, the actuator includes a metal coil disposed about the ferromagnetic material of the at least one portion of the rod, the metal coil is electrically actuatable to form a magnetic field to move the rod in an axial direction, and movement of the rod in the axial direction moves the stopper away from the first opening of the funnel to establish fluid communication between the volume of the inflatable structure and the channel of the stem via the cavity of the funnel. In some instances, the axial direction may be defined from the first opening of the funnel toward the second opening of the funnel. In certain instances, the metal coil may circumscribe at least a portion of the funnel with the funnel supported in the neck of the inflatable structure.

In some implementations, the actuator may include a motor mechanically coupled to the rod, and the motor is electrically actuatable to move the rod relative to the channel such that the stopper moves relative to the first opening of the cavity to control fluid communication between the volume of the inflatable structure and the channel of the stem via the cavity of the funnel. For example, the motor may be mechanically coupled to the rod via a coupling, the coupling is flexible, and the motor is electrically actuatable to transmit tension to the coupling. In some instances, the aerostat may further include a payload, wherein the payload may be mechanically coupled to the motor, and the weight of the payload exerting tension on the motor with the inflatable structure in flight. In certain instances, the aerostat may further include a spring, wherein force of the spring biases the stopper toward the first opening to restrict flow through the first opening, and the actuator may be electrically actuatable to move the stopper, via movement of the rod, in a direction opposite the force of the spring.

In certain implementations, the rod may be elongate, and the stopper is symmetric about any plane including a center axis defined along a longitudinal dimension of the rod. For example, the stopper may be spherical, ovoid, or conical.

In some implementations, the stem may define one or more openings outside of the volume of the inflatable structure, and the one or more openings are in fluid communication with the channel of the stem.

In certain implementations, the valve may further include a retainer, the rod has a first end portion and a second end portion, the stopper is supported on the first end portion of the rod in the cavity of the funnel, the second end portion of the rod extends outside of the channel, the retainer is coupled to the second end portion of the rod, and the retainer is engageable with the stem to limit axial movement of the rod in a direction toward the cavity of the funnel.

In some implementations, the valve may further include a seal supported by the funnel, the seal is disposed in the cavity of the funnel, the seal defines an orifice in fluid communication with the first opening of the cavity, and the stopper is seatable on the seal to form a flow restriction therebetween in response to a change in electrical activation of the actuator. In some instances, the seal may have a concave shape matching curvature of the stopper. In certain instances, the seal may be a T-shaped solid of revolution about a center axis defined by the rod.

In certain implementations, the aerostat may further include a controller configured to receive a signal indicative of flight of the inflatable structure and, based on the signal, to electrically actuate the actuator to move the rod relative to the channel such that the stopper moves relative to the first opening of the cavity to control fluid communication between the volume and the channel via the cavity. The signal indicative of flight conditions of the inflatable structure may include a change in altitude of the inflatable structure. In some instances, the aerostat may further include a ballast controller including a receptacle and a discharger, wherein the ballast controller is mechanically coupled to the inflatable structure, moisture released from the volume of the inflatable structure via actuation of the valve is collectible in the receptacle, the discharger is in electrical communication with the controller, and the controller is further configured to actuate the discharger in response to the signal indicative of flight conditions to release at least a portion of moisture collected in the receptacle. The signal indicative of flight conditions may include one or more of roll, pitch, and yaw of the inflatable structure. For example, the ballast controller is tethered to the valve. In some instances, the ballast controller may be mechanically coupled to the stem of the valve. Further, or instead, the receptacle may be at least partially coated with a hydrophobic material. Additionally, or alternatively, the receptacle may include a hydrophilic material. In some instances, the discharger may include a heater. Further, or instead, the receptacle may include a plurality of discrete sections, and the discharger is actuatable to release one or more of the plurality of discrete sections from the receptacle.

BRIEF DESCRIPTION OF THE FIGURES

Like reference symbols in the various drawings indicate like elements

DETAILED DESCRIPTION

Figure 1:
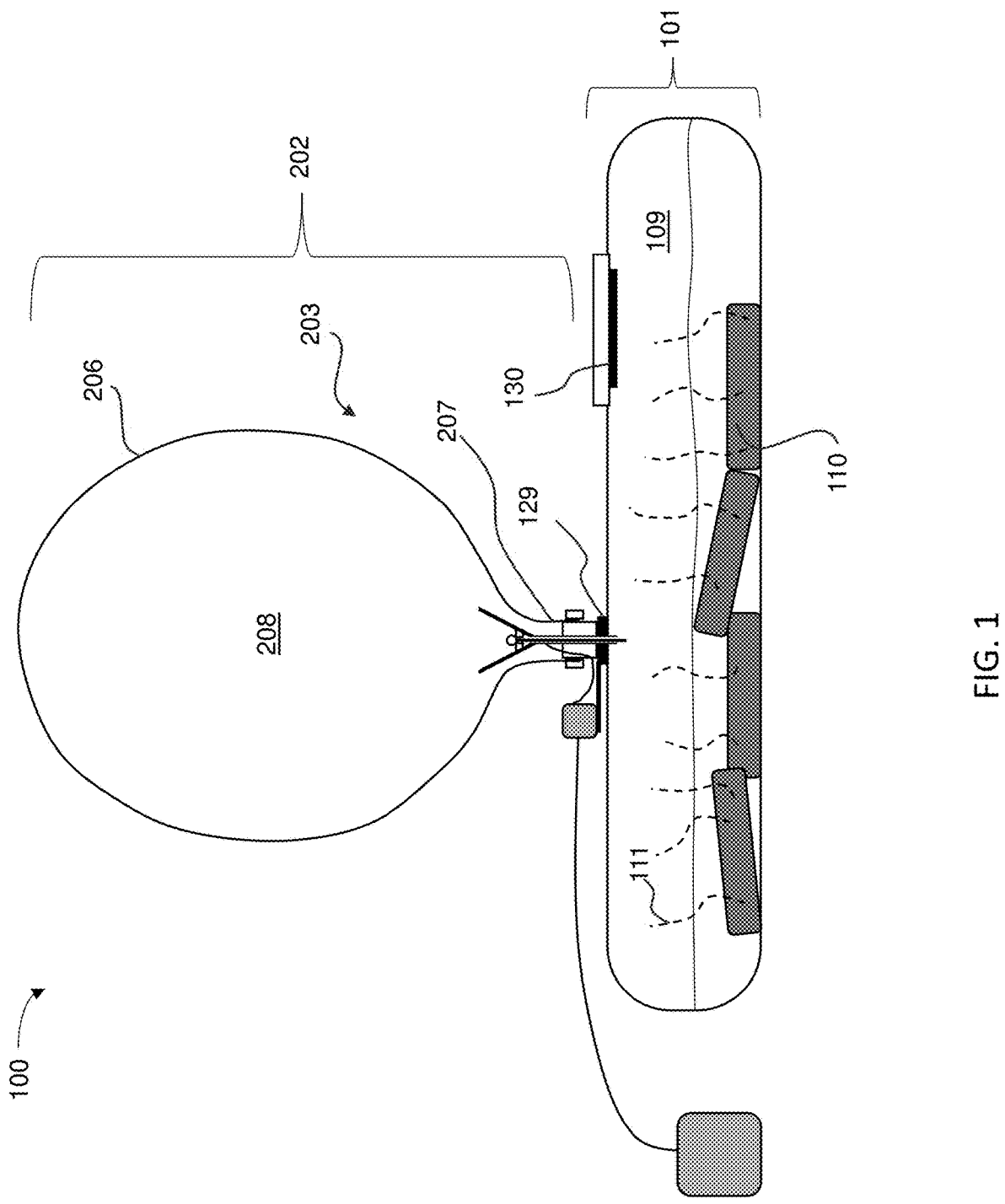
FIG. 1 is a schematic representation of a hydrogen generation system including a reaction chamber, an inflatable structure, and a payload attached to a valve of the inflatable structure.

Embodiments will now be described more fully hereinafter with reference to the accompanying figures, in which exemplary embodiments are shown. The foregoing may, however, be embodied in many different forms and should not be construed as limited to the exemplary embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or," and the term "and" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as including any deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) is intended merely to explain the embodiments and does not pose a limitation on the scope of those embodiments. No language in the specification should be construed as indicating any unclaimed element as essential to the practice of the disclosed embodiments.

As used herein, the term "gas" or variants thereof (e.g., lifting gas) shall be understood to include a single component or multiple components (mixed), unless otherwise specified or made clear from the context. Further, unless a contrary intent is indicated, the use of the term gas shall be generally understood to include any multi-phase mixture that includes one or more gas phase components and exhibits characteristics of a compressible fluid, with a relationship between pressure, volume, and temperature that is accurately characterized by the ideal gas law to within about +5 percent at room temperature at sea level. Thus, for example, a gas may include at least one gas phase component, as well as some amount of one or more vapor components (e.g., water vapor).

As used herein, the term "aerostat" shall be understood to include any one or more of various, different types of lighter-than-air aircraft that gain lift primarily from aerostatic lift, in contrast to aerodynes that primarily make use of aerodynamic lift requiring movement of a wing surface through air. In use cases described herein, an aerostat may contain a quantity of lifting gas such that the average density of the aerostat (containing the quantity of lifting gas) is less than or equal to the density of air at some altitude and, thus, the aerostat is at least neutrally buoyant in air for a period. Unmanned and unpowered aerostats are an important application for lifting gas and serve as useful examples for highlighting particular aspects of the devices, systems, and methods of the present disclosure. However, unless otherwise specified or made clear from the context, the term "aerostat" shall be understood to include any manner and form of object that can receive lifting gas to have at least some degree of buoyancy in air, whether in an indoor or an outdoor environment. Accordingly, as used herein, an aerostat may include any one or more of various, different manned or unmanned craft, dirigible or non-dirigible craft, independently propelled or floating craft, rigid or nonrigid craft, tethered or untethered craft, or combinations thereof. Further, it shall be understood that an aerostat includes at least an inflatable structure and may additionally include other elements, such as a payload and/or equipment for tethering to a payload. While this convention is used in the description that follows, it should generally be appreciated that the inflatable structure relates to other elements of launching systems in the same way that the aerostat relates to such launching systems. Thus, for the sake of reducing unnecessary repetition, launching the inflatable structure and/or detaching the inflatable structure as described herein may be used interchangeably with launching the corresponding aerostat and/or detaching the corresponding aerostat unless otherwise specified or made clear from the context.

For the sake of clear and efficient description, elements with numbers having the same last two digits in the disclosure that follows shall be understood to be analogous to or interchangeable with one another, unless otherwise explicitly made clear from the context, and, therefore, are not described separately from one another, except to note differences or to emphasize certain features. Thus, for example, a valve 204, a valve 304, a valve 404, etc. shall be understood to be analogous to or interchangeable with one another, unless otherwise specified or made clear from the context.

Figure 2A:
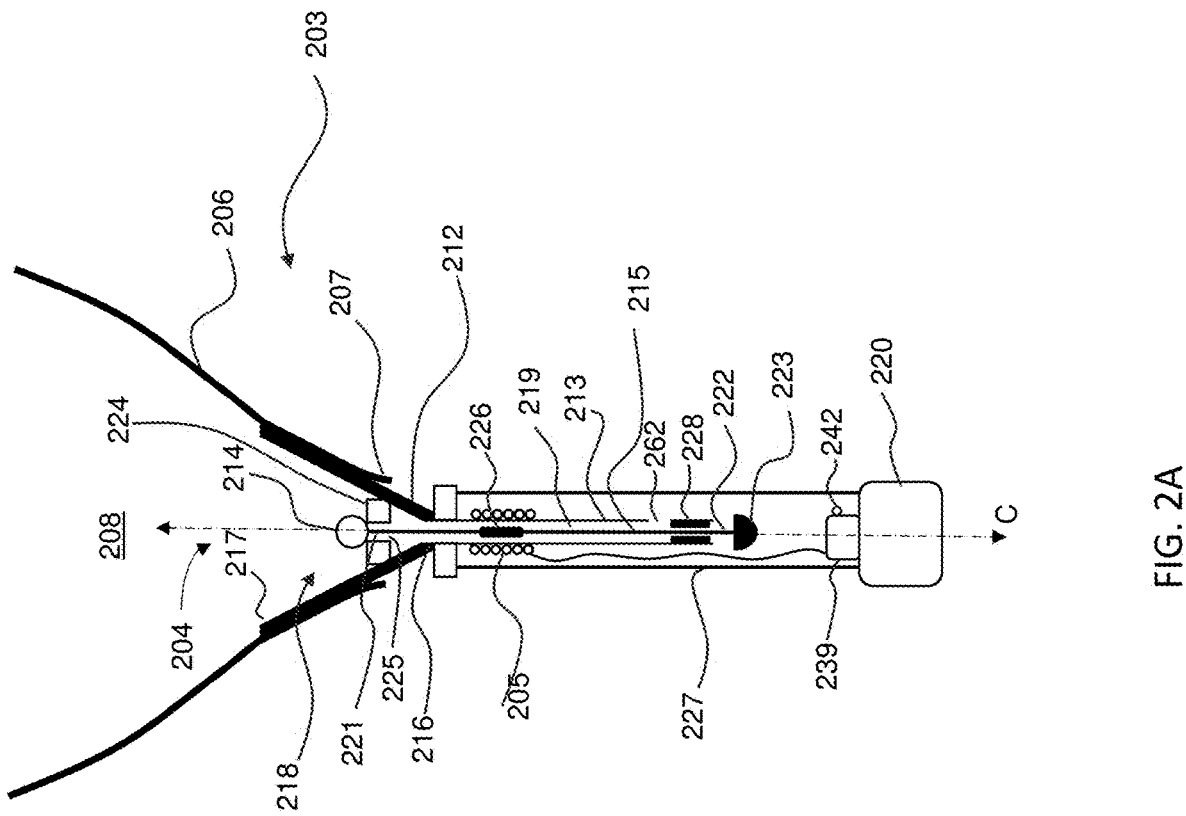
FIG. 2A is a closeup view of a portion of the hydrogen generation system of FIG. 1, the float of the valve including an electromagnet actuatable to open the valve to release a lifting gas and/or condensate from the inflatable structure in midair.
Figure 2B:
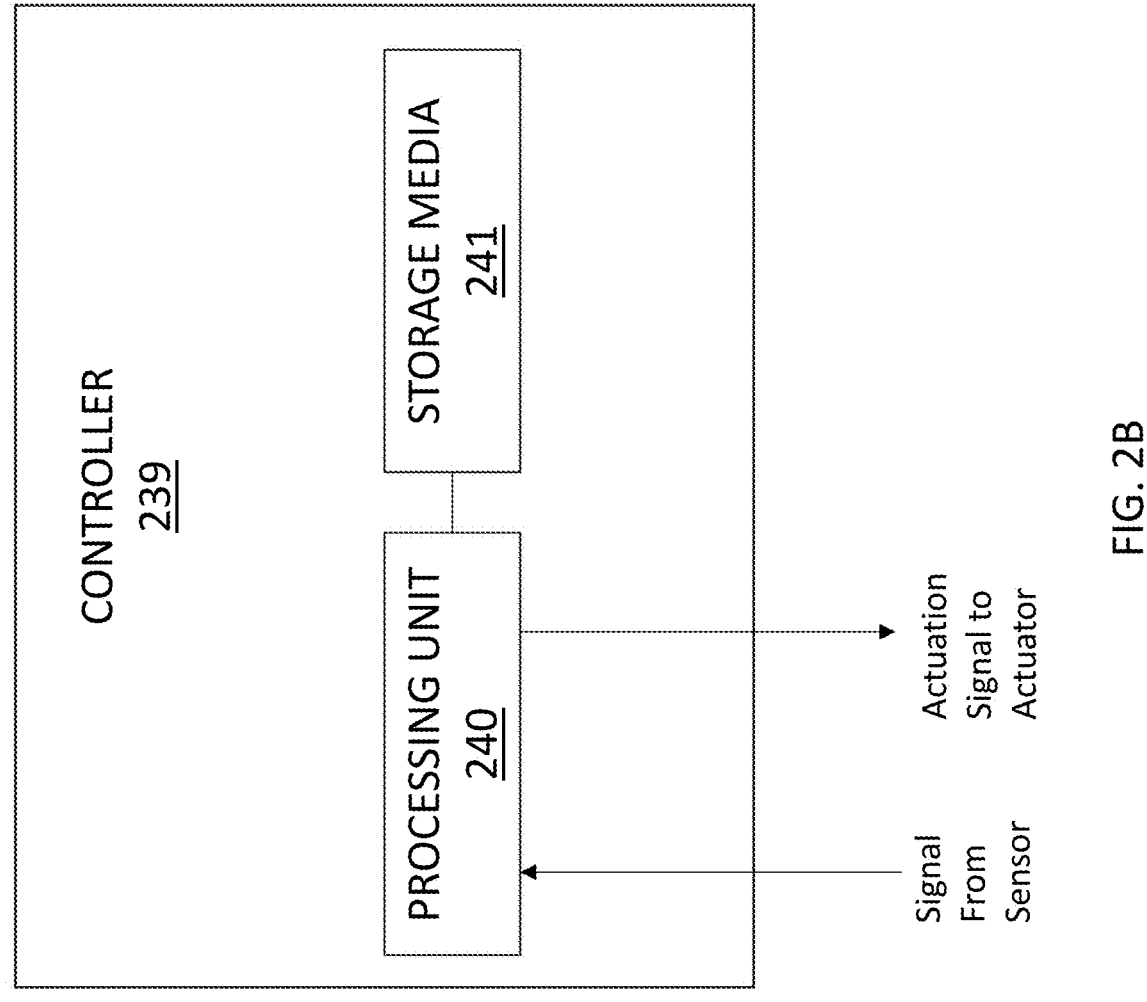
FIG. 2B is a schematic representation of a controller of the hydrogen generation system of FIG. 1.

Referring now to FIGS. 1, 2A and 2B, a hydrogen generation system 100 for launching lighter-than-air vessels may include a reactor 101 and an aerostat 202. The aerostat 202 may include an inflatable structure 203, a valve 204, and an actuator 205. The inflatable structure 203 may include a balloon 206 and a neck 207 collectively defining a volume 208. The reactor 101 may define a chamber 109 in fluid communication with the volume 208 via the neck 207, as the inflatable structure 203 is being inflated. For example, the valve 204 may be positioned away from the neck 207 to facilitate moving a lifting gas 111 containing hydrogen and steam from the chamber 109 into the volume 208 as the inflatable structure 203 is being inflated. Additionally, or alternatively, as described in greater detail below, at least a portion of the valve 204 may be movable into the neck 207 once the inflatable structure 203 has been filled with the lifting gas 111 and is separated from the reactor 101 such that the aerostat 202 is aloft. As an example, size of diameter of the funnel 212 may be sized relative to the diameter of the neck 207 to facilitate lifting a target weight of payload while reducing the likelihood of the funnel 212 being inadvertently pulled through the neck 207. As specific example, in instances in which the neck 207 has a diameter of 3 cm, the funnel 212 may have a 3-inch diameter for lifting smaller payloads like 5 lbs. However, for lifting larger payloads using the same size of the neck 207, the funnel 212 may have a 4-inch diameter or even up to a 5-inch diameter for lifting 40 lbs payloads while reducing the likelihood of the funnel 212 being pulled through the neck 207 under the fore of the payload.

As described in greater detail below, the actuator 205 may be electrically actuated to control opening and closing of the valve 204, thus controlling flight—namely, buoyancy and/or ballast—of the inflatable structure 203 floating in air under buoyancy force of the lifting gas 111 moved in the volume 208 of the inflatable structure 203. As compared to flight of an inflatable structure without a valve, the electrical actuation of the valve 204 via the actuator 205 may facilitate achieving longer periods and/or higher altitudes of flight through controlled release of condensed moisture (collected in the valve 204 as steam in the volume 208 condenses) that may act as ballast for the aerostat 202 but no longer provides lift to the aerostat 202. Further, or instead, as compared to flight of an inflatable structure with a mechanically actuatable valve (e.g., a valve that opens under the force of water collected in a volume of the inflatable structure), the electrical actuation of the valve 204 using the actuator 205 may facilitate achieving more refined control over altitude of flight and/or more stability of flight under windy atmospheric conditions through controlled release of the lifting gas 111 and/or condensed moisture from the volume 208 of the inflatable structure 203. That is, as compared to the use of a mechanically actuatable valve, the electrical actuation of the valve 204 may facilitate decoupling the impact of certain environmental conditions (such as those that result on condensing moisture in the volume 208 of the inflatable structure 203) from flight of the aerostat 202, making a wider range of aerostat 202 flight paths more repeatably and reliably achievable.

In use, activated aluminum 110 may be reacted with water in the chamber 109 of the reactor 101 to produce the lifting gas 111. The activated aluminum 110 may include activated aluminum, such as set forth in U.S. Pat. No. 10,745,789, issued to Jonathan Thurston Slocum on Aug. 18, 2020, and entitled "Activated Aluminum Fuel," the entire contents of which are hereby incorporated herein by reference. While the lifting gas 111 is described herein as being produced from reaction of the activated aluminum 110 with water, it shall be understood that devices, systems, and methods of the present disclosure may be applied to any one or more of various, different types of lifting gases containing steam and produced at or near the point of end-use of the lifting gas. In the reaction of the activated aluminum 110 with water, about half the energy released goes to heat and half to generate hydrogen. As a result, typically about eight times as much steam is generated by volume than hydrogen. Thus, a large amount of extra lift in the aerostat 202 is possible if the inflatable structure 203 is filled quickly (before the steam condenses from the lifting gas 111) and sent aloft. Further, the time required to inflate the inflatable structure 203 with the lifting gas 111 may be important, or even critical, for launching an aerostat 202 to achieve desired objectives of a particular mission (e.g., rapidly acquiring observational data and/or evading detection at a launch site). Once the inflatable structure 102 is filled with the lifting gas 111, the aerostat 202 may be decoupled from the reactor 101 and buoyancy of the lifting gas 111 may lift the aerostat 202 for flight. The valve 204 may be controlled according to any one or more of the various, different techniques described herein to control buoyancy of the aerostat 202 and/or to control ballast of the aerostat 202.

In general, the valve 204 may include a funnel 212, a stem 213, a stopper 214, and a rod 215. The funnel 212 may define a first opening 216, a second opening 217, and a cavity 218 therebetween. The stem 213 may define a channel 219, the stopper 214 may be disposed in the cavity 218, and the rod 215 may be coupled to the stopper 214 and at least partially disposed in the channel 219. Further, or instead, the stem 213 may extend at least partially outside of the inflatable structure 203 such that condensed moisture and/or hydrogen gas in the volume 208 may be released to an environment outside of the inflatable structure 203 via the channel 219 of the stem 213. The stem 213 may be connected to the funnel 212 either directly via a welded joint, or via a spaced block that the stem 213 may be screwed into or glued into to facilitate concentrically aligning the stem 213 with the funnel 212 itself.

For example, as the rod 215 is actuated to move axially (e.g., according to any one or more of the various, different techniques described herein) within channel 219, the stopper 214 coupled to the rod 215 may undergo corresponding axial movement within the cavity 218 of the funnel 212. In particular, the axial movement of the stopper 214 within the cavity 218 of the funnel 212 may the position the stopper 214 relative to the first opening 216 of the funnel 212, thus controlling fluid flow through the first opening 216 of the funnel 212. Stated differently, actuation to move the rod 215 moves the stopper 214 relative to the first opening 216 of the funnel 212 and, such movement of the stopper 214 relative to the first opening 216 controls fluid communication between the volume 208 of the inflatable structure 203 and the channel 219 via the cavity 218 of the funnel 212.

In certain instances, the funnel 212 may be supportable in the neck 207 of the inflatable structure 203 with the volume 208 of the inflatable structure 203 is in fluid communication with the cavity 218 via the second opening 217 of the funnel 212. For example, as the lifting gas 111 flows from the chamber 109 of the reactor 101 into the volume 208 of the inflatable structure 203, the funnel 212 may be within the volume 208 and unseated from the neck 207. This may be useful for reducing the likelihood of the valve 204 impeding ingress of the lifting gas 111 into the volume 208, while imparting swirl to the lifting gas 111 and providing some protection with respect to particles carried in the lifting gas 111. The stem 213 extending at least partially outside of the inflatable structure 203 may reduce the amount of movement of the valve 204 within the volume 208 as high flow rates of the lifting gas 111 buffet the funnel 212 away from seating in the neck 207 of the inflatable structure 203. Continuing with this example, as buoyancy force of the lifting gas 111 in the volume 208 of the inflatable structure 203 moves the aerostat 202 aloft, weight of a payload 220 tethered to the valve 204 may pull the funnel 212 into the neck 207. The funnel 212 seated in the neck 207 may form a gas-tight or at least substantially gas-tight seal therebetween such that valve 204 may be operable between open and closed positions according to any one or more of the various different techniques described herein to control release of condensed moisture and/or hydrogen from the volume 208 according to flight objectives.

In certain implementations, the valve 204 may be normally-closed. That is, in the absence of power to the actuator 205, the stopper 214 may restrict flow through the first opening 216 of the cavity 218. For example, the stopper 214 may be heavier than buoyant forces imparted on the stopper 214 by condensed moisture collected in the cavity 218 of the funnel 212 while the valve 204 is closed. Additionally, or alternatively, the stopper may be lighter than buoyant forces imparted on the stopper 214 by condensed moisture collected in the cavity 218 of the funnel 212 and spring bias force may hold the valve 204 in a normally-closed position.

With electrical actuation of the actuator 205, the actuator 205 may move the stopper 214 away from the first opening 216 of the cavity 218 to establish fluid communication between the volume 208 of the inflatable structure 203 and the channel 219 of the stem 213 via the cavity 218 of the funnel 212. It shall be appreciated that, as compared to a normally-open configuration, the normally-closed operation of the valve 204 may require significantly less power for achieving flight objectives of the aerostat 202. In turn, the lower power requirement associated with normally-closed operation of the valve 204 may facilitate implementing actuation of the actuator 205 using a smaller power source carried as part of the payload 220.

In general, the rod 215 may have a first end portion 221 and a second end portion 222, with the stopper 214 supported on the first end portion 221 of the rod 215 in the cavity 218 of the funnel 212. For example, the rod 215 may be elongate (e.g., having a diameter of ⅛" or less) from the first end portion 221 to the second end portion 222. Additionally, or alternatively, a maximum outer dimension of the rod 215 may be less than a maximum inner dimension of the channel 219. That is, in response to actuation of the actuator 205, the rod 215 may move axially within the channel 219 with little or no contact with the stem 213 along the channel 219 to move the stopper 214 relative to the first opening 216 of the funnel 212. Further, or instead, through actuation of the actuator 205 to move the rod 215 to open the valve 204, condensed moisture and/or gas in the volume 208 of the inflatable structure 203 may flow through the first opening 216 and along the channel 219 in a space between the stem 213 and the portion of the rod 215 disposed in the channel 219. Still further or instead, the stem 213 may define one or more openings 262 outside of the volume 208 of the inflatable structure 203 and in fluid communication with the channel 219 of the stem 213. Thus, as condensed moisture and/or gas flow along the space between the stem 213 and the rod 215 along the channel 219, the condensed moisture and/or gas may vent to the environment—and, thus, away from the aerostat 202—through the one or more openings 262.

In some implementations, the valve 204 may additionally, or alternatively, include a retainer 223 (e.g., an acorn nut).

For example, the second end portion 222 of the rod 215 may extend outside of the channel 219 of the stem 213, and the retainer 223 may be coupled to the second end portion 222 of the rod 215 outside of the channel 219 of the stem 213. Further, or instead, the retainer 223 may be engageable with the stem 213 to limit axial movement of the rod 215 in a direction toward the cavity 218 of the funnel 212. As an example, the retainer 223 may have a maximum outer dimension (e.g., an outer diameter) larger than a maximum dimension of the channel 219 such that the rod 215 is unable to retract through the channel 219 of the stem 213. That is, geometric interference between the retainer 223 and the stem 213 may limit the axial travel of the stopper 214 away from the first opening 216 in the cavity 218 of the funnel 212. Thus, with such geometric interference, the rod 215 is unable to retract through the channel 219 of the stem 213 in instances in which the stopper 214 rises in response to buoyant forces of condensed moisture collected in the cavity 218 of the funnel 212 while the valve 204 is closed.

In certain implementations, the valve 204 may further, or instead, include a seal 224 (e.g., a foam washer, a gasket, a molded rubber, or a combination thereof) supported by the funnel 212. For example, the seal 224 may be disposed in the cavity 218 of the funnel 212, and the seal 224 may define an orifice 225 in fluid communication with the first opening 216 of the cavity 218. The stopper 214 may be seatable on the seal 224 to form a flow restriction between the stopper 214 and the seal 224 in response to a change in electrical activation of the actuator. As an example, in instances in which the valve 204 is normally-closed, the stopper 214 may seat on the seal 224 in response to deactivation of the actuator 205. Additionally, or alternatively, the seal 224 may be formed of a material conformable to the stopper 214. Continuing with this example, the stopper 214 seats on the seal 224, the material of the seal 224 may conform to the stopper 214 to reduce or eliminate flow between the stopper 214 and the seal 224 and, thus, reducing or eliminating flow through the first opening 216 of the funnel 212. That is, because the seal 224 does not have the same structural requirements as the funnel 212, the seal 224 may be formed of a material softer than that of the funnel 212 and such softer material may facilitate forming a higher quality seal with the stopper 214. Further, or instead, by providing softer seating for the stopper 214, the seal 224 may reduce the likelihood of unintended wear and/or damage to the valve 204 as the valve 204 cycles through opening and closing cycles according to the requirements of an intended flight mission of the aerostat 202.

In general, the actuator 205 may be any one or more of various, different types of actuators actuatable based on controlling electrical power delivered to the actuator 205 at least while the aerostat 202 is in flight. For example, controlling electrical power delivered to the actuator 205 may include activating and deactivating (e.g., from a power supply carried as part of the payload 220 of the aerostat 202) the actuator 205. For example, switching power of the actuator 205 to activate and deactivate the actuator 205 may correspond to switching the valve 204 between open and closed states. For example, with power to the actuator 205 such that the actuator 205 is actuated, the actuator 205 may exert power on the rod 215 to move the rod 215 axially along the channel 219, with such axial movement of the rod 215 resulting in corresponding axial movement of the stopper 214 away from the first opening 216 to open the valve 204. Continuing with this example, with power to the actuator 205 deactivated, the power exerted by the actuator 205 on the rod 215 may be removed, and the stopper 214 may move toward the first opening 216 to restrict fluid communication between the first opening 216 and the volume 208 of the inflatable structure 203 via the second opening 217—that is, to close the valve 204.

In certain implementations, the actuator 205 may be electrically actuatable to generate electromagnetic energy directed to the rod 215 to move the rod 215 relative to the channel 219, thus moving the stopper 214 relative to the first opening 216 to control fluid communication between the first opening 216 and the volume 208 of the inflatable structure via the second opening 217 of the funnel 212. For example, at least one portion 226 of the rod 215 may be formed of a ferromagnetic material, and the actuator 205 may include a metal coil disposed about the ferromagnetic material of the rod 215. The metal coil of the actuator 205 may be electrically actuatable to form a magnetic field about the at least one portion 226 of the rod 215 to move the rod 215 in an axial direction along the channel 219. The axial direction may be defined from the first opening 216 toward the second opening 217 of the funnel 212 in some implementations. However, as described in greater detail below, the stopper 214 may be spring-biased such that the axial direction of movement of the rod 215 to open the valve 204 may be from the second opening 217 toward the first opening 216 of the funnel 212. Movement of the rod 215 in the axial direction associated with moving the stopper 214 away from the first opening 216 of the funnel 212 to open the valve 204 establishes fluid communication between the volume 208 of the inflatable structure 203 and the channel 219 of the stem 213 via the cavity 218 of the funnel 212, thus allowing condensed moisture and/or gas to escape from the volume 208 of the inflatable structure 203 upon actuation of the actuator 205. That is, with the actuator 205 actuated, condensed moisture may flow past the stopper 214, through the seal 224, and down into the channel 219 of the stem 213, and out of the one or more openings 262 defined by the stem 213. Additionally, or alternatively, condensed moisture may flow past the rod 215 in the channel 219, where the condensed moisture may flow through a guide bushing 228 supporting the rod 215 in the channel 219. Optionally, an upper guide bushing may have axial grooves or holes to facilitate the flow of water to flow past, and such an upper guide bushing may help with seal stability.

While the metal coil of the actuator 205 may be disposed about any portion of the rod 215 formed of ferromagnetic material, it shall be appreciated that the coil may circumscribe at least a portion of the funnel 212 with the funnel 212 supported in the neck 207 of the inflatable structure 203 in some implementations. Such positioning of the coil may be useful for, among other things, facilitating assembly of the valve 204 facilitating proper seating of the valve 204 in response to tension on a tether 227 coupling the payload 220 to the valve 204.

In general, the stopper 214 may be any one or more of various different shapes complementary to the seat of the stopper 214 such that the stopper 214 and one or both of the seal 224 or the funnel 212 may form a line seal and/or an area seal. As an example, the stopper 214 may be symmetric about any plane including a center axis C defined along a longitudinal dimension of the rod 215. Such symmetry may be useful, for example, for facilitating assembly of the valve 204 and, further or instead, may facilitate robust operation of the valve 204 under challenging field conditions. Some examples of symmetric shapes of the stopper 214 include spherical, ovoid, and conical.

In some implementations, the aerostat 202 may further include a controller 239 including a processing unit 240 and non-transitory computer-readable storage media 241, with the non-transitory computer-readable storage media 241 having stored thereon instructions for causing the processing unit 240 to carry out any one or more steps associated with electrically actuating the actuator 205 to control opening and closing of the valve 204. For example, the aerostat 202 may include a sensor 242. The controller 239 may be in electrical communication with the sensor 242 and the actuator 205. The non-transitory computer-readable storage media 241 may have stored thereon instructions for causing the processing unit to receive, from the sensor 242, a signal indicative of flight of the inflatable structure 203 (e.g., altitude of the aerostat 202 and/or change in altitude of the aerostat 202) and, based on the signal, to electrically actuate the actuator 205 to move the rod 215 relative to the channel 219 such that the stopper 214 moves relative to the first opening 216 of the cavity 218 to control fluid communication between the volume 208 and the channel 219 via the cavity 218 of the funnel 212.

In general, the reactor 101 may define a first outlet 129 and a second outlet 130 in fluid communication with the chamber 109. The lifting gas 111 generated in the chamber 109 of the reactor 101 may flow into the volume 208 of the inflatable structure 203 via the first outlet 129 to fill the volume 208 with the lifting gas 111. Further, or instead, one or more of the reactants (e.g., the activated aluminum 110 and/or water) may be introduced into the chamber 109 through the second outlet 130 and/or reaction byproducts may be removed from the chamber 109 via the second outlet 130 (e.g., after the inflatable structure 203 has been released from the reactor 101). As an example, the second outlet 130 may be a roll-up tube. Even though such a roll-up tube may not seal perfectly, the flowrate of gas out of the first outlet 129 relative to the flow rate of gas out of the second outlet 230 may be insignificant over about 10-15 minutes of reaction time for generating the lifting gas 111 to fill the volume 208 of the inflatable structure 203.

In certain implementations, the activated aluminum 110 may be contained in a mesh casing to facilitate metering the flowrate of water that can reach the activated aluminum 110 and react in a concentrated manner in the chamber 109 of the reactor 101. This may facilitate reacting the activated aluminum 110 with water in the chamber 109 in a controlled manner (e.g., releasing a substantially steady stream of hydrogen gas). When reacted in saltwater, the reaction rate of the activated aluminum 110 to produce hydrogen may be additionally, or alternatively, controlled using one or more additives (e.g., caffeine). As compared to an uncontrolled flow rate, such a controlled flow rate may facilitate using the first outlet 129 to accommodate a larger fuel load with a lower likelihood of rupturing the reactor 101 due to excess gas generation. As a specific example, 3 kg of the activated aluminum 110 in mesh casings may be loaded into the chamber 109 of the reactor 101 (e.g., a 35 gallon pillow tank) with 60L of salt-water and caffeinated iced-tea added. The first outlet 129 having an approximately 2" diameter may accommodate the gas flowrate out of the lifting gas 111 from the chamber 109 with a lower likelihood of rupturing the reactor 101 with little or no degradation of hydrogen yield, as compared to smaller sizes of the first outlet 129.

While aerostats have been described as including electromagnetic actuators for opening and closing valves to control release of contents of the volume of an inflatable structure for buoyancy and/or ballast control, the use of other types of actuators is additionally, or alternatively, possible.

Figure 3:
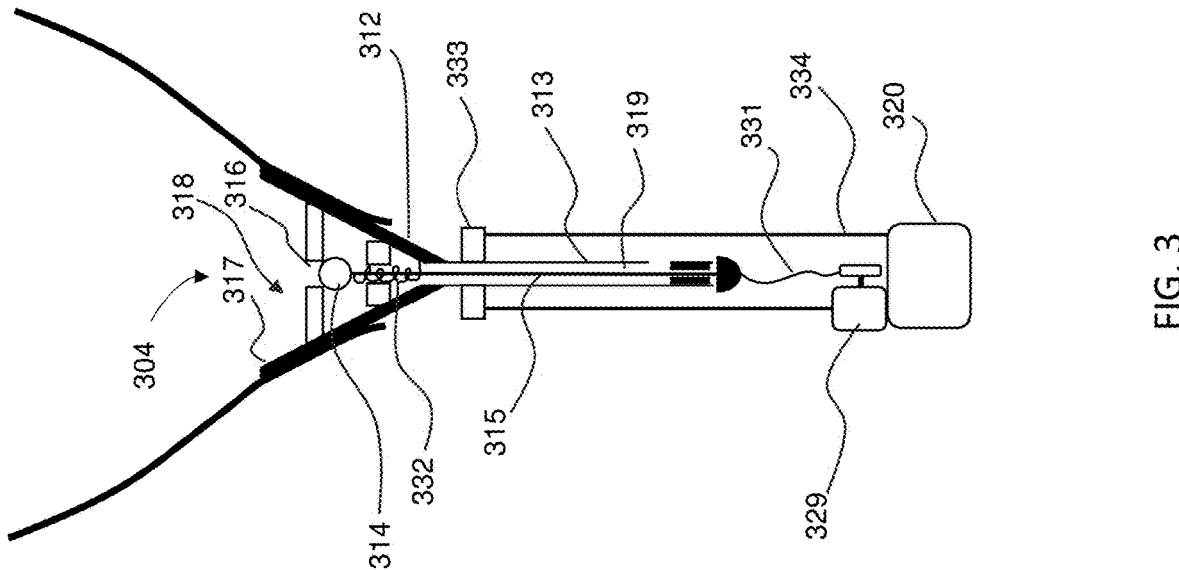
FIG. 3 is a closeup view of a portion of a hydrogen generation system, shown with a valve including a float, a spring, and a motor, the spring preloaded to push the float into a seal, and the motor actuatable to pull down on a stem to open the valve to release fluid from the balloon.

For example, referring now to FIG. 3, a valve 304 may include a funnel 312, a stem 313, a stopper 314, a rod 315, and an actuator 329. The funnel 312 defines a first opening 316 and a second opening 317 defining a cavity 318 therebetween. The cavity 318 is in fluid communication with the volume 208 via the second opening 317. The stopper 314 may be coupled to the rod 315, and at least a portion of the rod 315 may be disposed within a channel 319 defined by the stem 313 and extending at least partially outside of the inflatable structure 203. The actuator 329 may include a motor electrically actuatable to move the rod 315 relative to the channel 319 such that the stopper 314 moves relative to the first opening 316 of the cavity to control fluid communication between the volume 208 of the inflatable structure 203 and the channel 319 of the stem 313 via the cavity 318 of the funnel 312.

In certain implementations, the motor of the actuator 329 may be mechanically coupled to the rod 315 via a coupling 331. As an example, the coupling 331 may be flexible (e.g., a string, a rope, a belt, etc.), and the motor of the actuator 329 may be electrically actuatable to transmit tension to the coupling 331. In turn, the tension on the coupling 331 may be transmitted into tension on the rod 315 to move the rod 315 in an axial direction defined from the second opening 317 toward the first opening 316 to move the stopper 314 away from the first opening 316, thus establishing fluid communication between the channel 319 of the stem and the volume 208 of the inflatable structure 203 via the cavity 318 of the funnel 312.

In certain implementations, the motor of the actuator 329 may be mechanically coupled to a payload 320. For example, the valve 304 may include a flange 333 coupled to the stem 313, and the payload 320 may hang from the flange 333 via a string 334 such that the weight of the payload 320 may exert tension on the motor of the actuator 329 with the inflatable structure 203 in flight. Continuing with this example, the tension of the weight of the payload 320 on the motor of the actuator 329 may act as a counterforce to the tension exerted by the motor of the actuator 329 on the rod 315 such that the rod 315 actuation of the motor of the actuator 329 moves the rod 315 toward the motor instead of moving the motor toward the rod 315.

In some implementations, the valve 304 may include a spring 332 to facilitate returning the stopper 314 to a seated position restricting flow through the first opening 316. For example, the spring 332 may be arranged relative to the stopper 314 such that force of the spring 332 biases the stopper 314 toward the first opening 316 to restrict flow through the first opening 316. The motor of the actuator 329 may be electrically actuatable to move the stopper 314, via movement of the rod 315, in a direction opposite the force of the spring 332. Stated differently, the motor of the actuator 329 may be electrically actuatable to pull on the rod 315 to move the stopper 314 in a first axial direction away from the first opening 316 and, with the motor of the actuator 329 deactivated, the spring 332 may push the rod 315 to move the stopper in a second axial direction toward the first opening 316.

While an actuator including a motor has been described as pulling on a rod to open a valve, the use of an actuator including a motor may be additionally, or alternatively, used to push a rod to open a valve.

Figure 4:
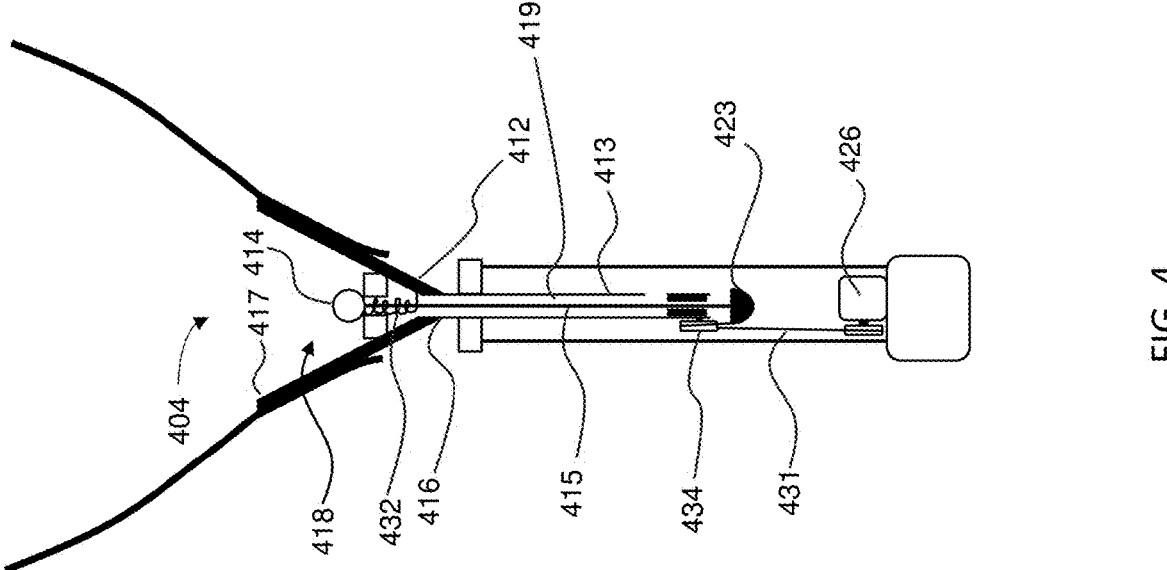
FIG. 4 is a closeup view of a portion of a hydrogen generation system, shown with a valve including a float, a spring, and a motor, the spring preloaded to pull the float into a seal, and the motor actuatable to pull on a stem to open the valve to release fluid from the balloon.

For example, referring now to FIG. 4, a valve 404 may include a funnel 412, a stem 413, a stopper 414, a rod 415, and an actuator 426. The funnel 412 defines a first opening 416 and a second opening 417 defining a cavity 418 therebetween. The cavity 318 is in fluid communication with the volume 208 via the second opening 417. The stopper 414 may be coupled to the rod 415, and at least a portion of the rod 315 may be disposed within a channel 419 defined by the stem 413 and extending at least partially outside of the inflatable structure 203.

The actuator 419 may include a motor electrically actuatable to push the rod 415 relative to the channel 319 such that the stopper 414 moves away from the first opening 316 of the cavity 418 to control fluid communication between the volume 208 of the inflatable structure 203 and the channel 419 of the stem 413 via the cavity 418 of the funnel 412. For example, the valve 404 may include a pulley 434, and the motor of the actuator 419 may be in mechanical communication with the rod 415 via a coupling 431 (e.g., a string, a rope, a belt, etc.) rounded over the pulley 434. That is, the coupling 431 may extend from the motor of the actuator 419 to the rod 415, with the coupling 431 rounded over the pulley 434 between the motor of the actuator 419 and the rod 415.

Through actuation of the motor of the actuator 419 the coupling 431 may be pulled over the pulley 434 to generate a pushing force on the rod 415. In turn, the pushing force on the rod 415 may move the stopper 414 in a direction away from the first opening 416 to allow fluid communication between the channel 419 of the stem 413 and the volume 208 of the inflatable structure 203 via the cavity 418 of the funnel 412. While the coupling 431 may be attached directly to the rod 415 in some instances, it shall be appreciated that the coupling 431 may be attached to a retainer 423 attached to the rod 415, as may be useful for facilitating attachment of the coupling 431 in secure mechanical communication with the rod 415. In certain instances, the valve 404 may further, or instead, include a spring 432 biasing the stopper 414 toward the first opening 416. Thus, following activation of the motor of the actuator 426 to push the stopper 414 away from the first opening 416, force of the spring 432 may pull the stopper toward the first opening 416 upon deactivation of the motor of the actuator 426.

While ballast control of aerostats has been described with respect to releasing condensed moisture through electrical actuation of an actuator, other types of ballast control are additionally or alternatively possible.

Figure 5:
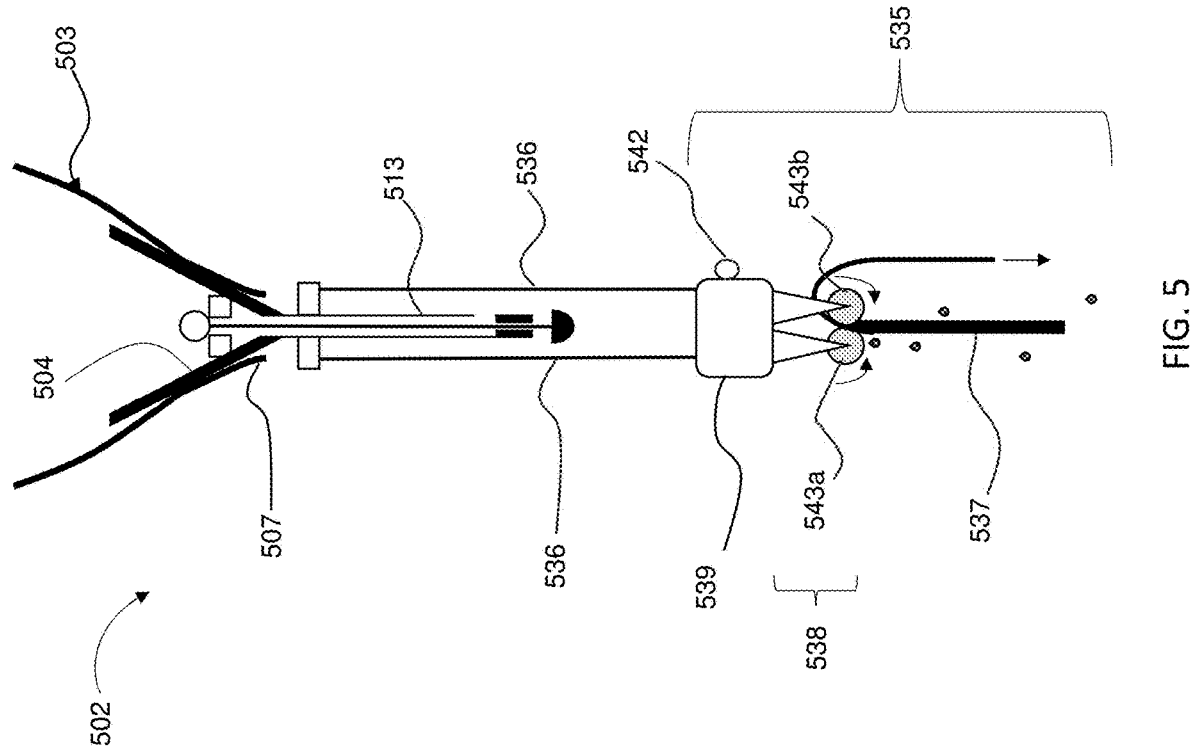
FIG. 5 is a closeup view of a portion of a hydrogen generation system, shown with a valve including a ballast control device hanging from an outer stem of the valve hydrophilic material wringable by a pair of rollers to control ballast.

For example, referring now to FIG. 5, an aerostat 502 may include an inflatable structure 503, a valve 504, and a ballast controller 535. The inflatable structure 503 may be any one or more of the various, different inflatable structures described herein. Further, or instead, unless otherwise specified, the valve 504 may be any one or more of the various different valves described herein. The ballast controller 535 may be mechanically coupled to the inflatable structure 503, such as through one or more tethers 536 attached to the valve 504 (e.g., attached to a stem 513 of the valve 504) with the valve 504 supported in a neck 507 of the inflatable structure 503.

As compared to controlling ballast using only the valve 504, the ballast controller 535 may facilitate achieving finer degrees of ballast control and/or may facilitate at least partially decoupling ballast control from controlling composition of contents within the inflatable structure 503. For example, the ballast controller 535 may include a receptacle 537 and a discharger 538. Condensed moisture released from the inflatable structure 503 via actuation of the valve 504 according to any one or more of the various different techniques described herein may be collected in the receptacle 537, where the condensed moisture may serve as ballast for stabilizing flight of the aerostat 502. The discharger 538 may be in electrical communication with a controller 539. The controller 539 include instructions stored on non-transitory computer-readable media for causing a processing unit of the controller 539 to actuate the discharger 538 in response to a signal from a sensor 542 to release at least a portion of the condensed moisture collected in the receptacle 537. The signal may be indicative of flight conditions and may include, for example, altitude, change in altitude, temperature, roll, pitch, yaw, or combinations thereof.

In certain implementations, the receptacle 537 may be a hydrophilic material capable of storing a large quantity of water in frozen and/or liquid form. When laden with water released from the valve 504, the hydrophilic material of the receptacle 537 may serve as ballast for the aerostat 502 floating through the atmosphere. The discharger 538 may include a pair of rollers 543a,b actuatable by the controller 539 to rotate. As the pair of rollers 543a,b rotate, the hydrophilic material of the receptacle 537 may move between the pair of rollers 543a,b to remove moisture (e.g., wring liquid or break ice) from the hydrophilic material to shed weight of the moisture stored in the hydrophilic material of the receptacle 537, thus reducing the total mass of the aerostat 502 and facilitating longer and/or higher flight.

Figure 6:
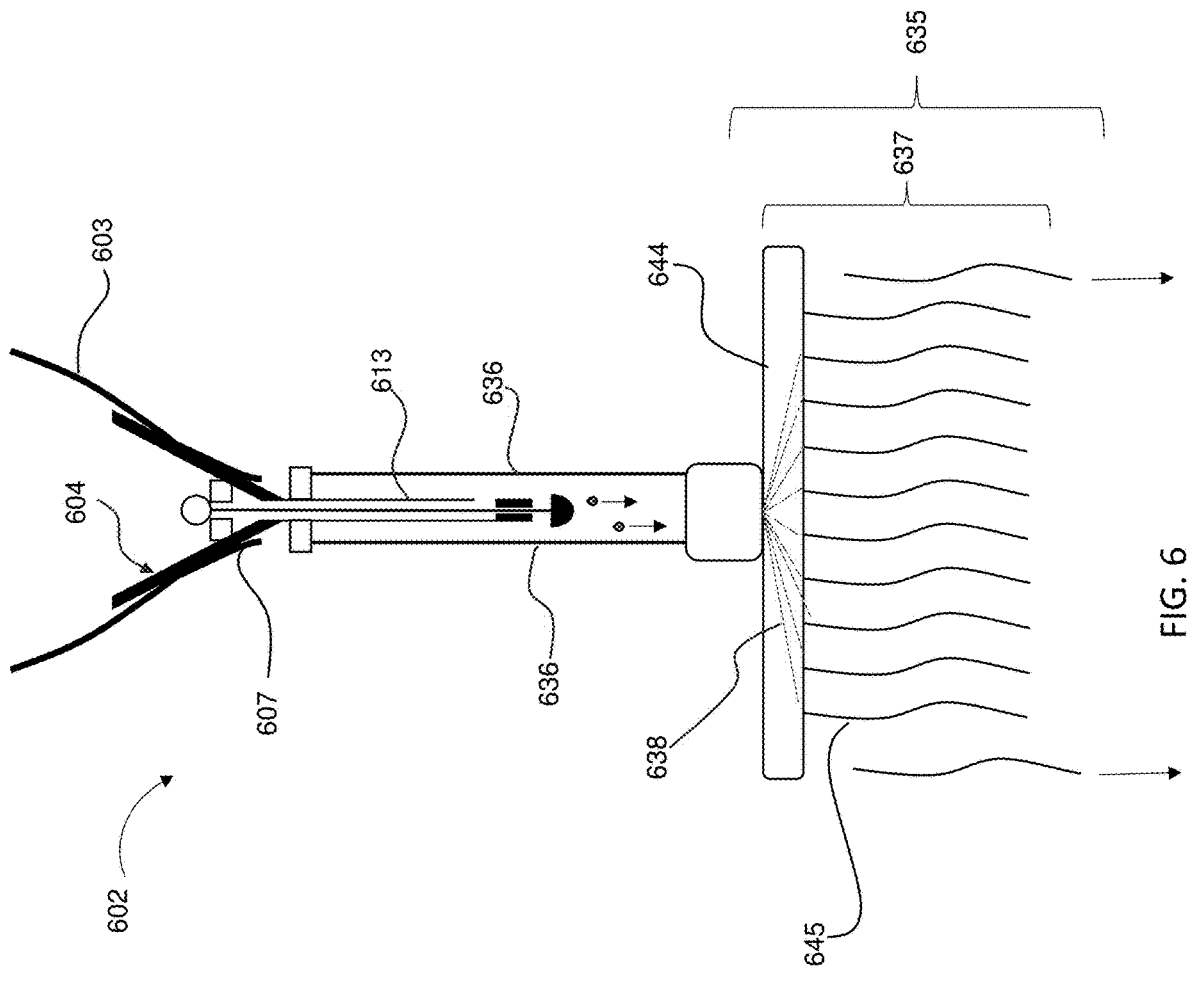
FIG. 6 is a closeup view of a portion of a hydrogen generation system, shown with a valve with a ballast control device hanging from the outer stem of the valve, wherein water that drains from the valve is collected by a with multiple sections of absorbent material of the ballast control device, with each section of absorbent material releasable from the ballast control device to control ballast.

As another example, referring now to FIG. 6, an aerostat 602 may include an inflatable structure 603, a valve 604, and a ballast controller 635. The inflatable structure 603 may be any one or more of the various, different inflatable structures described herein. Further, or instead, unless otherwise specified, the valve 604 may be any one or more of the various different valves described herein. The ballast controller 635 may be mechanically coupled to the inflatable structure 503, such as through one or more tethers 636 attached to the valve 604 (e.g., attached to a stem 613 of the valve 504) with the valve 604 supported in a neck 607 of the inflatable structure 603.

The ballast controller 635 may include a receptacle 637 and a discharger 638. For example, the receptacle 637 may include an array 644 of wicks 645 below the valve 604. As the valve 604 releases condensed moisture, the wicks 645 may collect at least a portion of the moisture to serve as ballast for the aerostat 602. Each one of the wicks 645 may hang from the array 644. With the aerostat 602 in flight, the discharger 638 may be actuated to separate one or more of the wicks 645 from the array 644 to reduce weight of the aerostat 602 as necessary or useful. For example, the discharger 638 include respective wires supporting each one of the wicks 645 such that the discharger 638 may have individual dropping control of each one of the wicks 645. Such individual control may shed ballast to facilitate maintaining a substantially constant altitude throughout the days and nights over a short duration mission of about 2-4 days.

Figure 7:
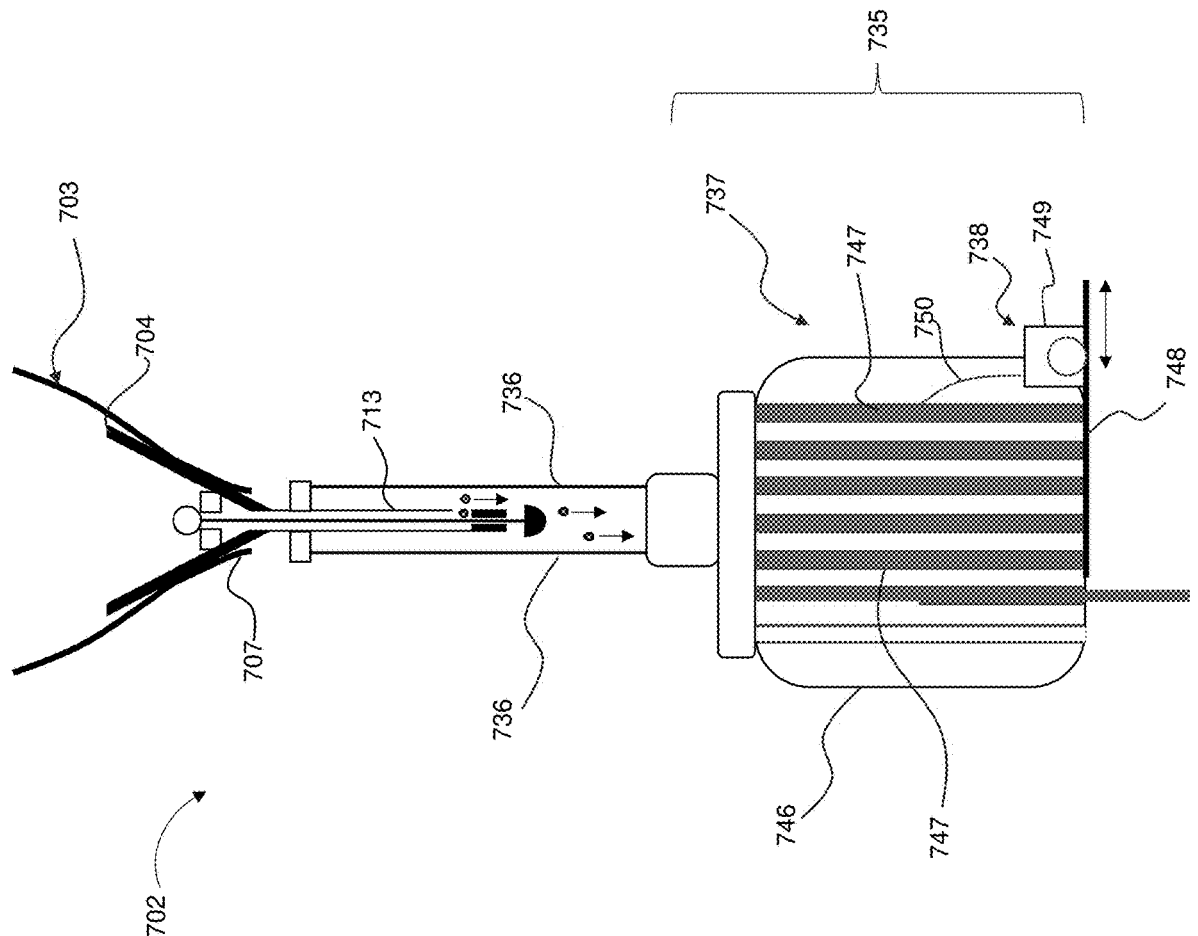
FIG. 7 is a closeup view of a portion of a hydrogen generation system including a valve and a ballast control device, the ballast control device including a modular structure having a plurality of reservoirs fillable with water released by the valve, and the ballast control device actuatable to release each reservoir to control ballast.

As another example, referring now to FIG. 7, an aerostat 702 may include an inflatable structure 703, a valve 704, and a ballast controller 735. The inflatable structure 703 may be any one or more of the various, different inflatable structures described herein. Further, or instead, unless otherwise specified, the valve 704 may be any one or more of the various, different valves described herein. The ballast controller 735 may be mechanically coupled to the inflatable structure 703, such as through one or more tethers 736 attached to the valve 704 (e.g., attached to a stem 713 of the valve 704) with the valve 704 supported in a neck 707 of the inflatable structure 703.

The ballast controller 735 may include a receptacle 737 and a discharger 738. For example, the receptacle 737 may include a container 746 defining a plurality of reservoirs 747 fillable with condensed moisture released from the valve 704. The plurality of reservoirs 747 may be partially defined by a gate 748. The discharger 738 may include a motor 749 coupled to the gate 748 and actuatable to slide the gate 748 to release a predetermined quantity of condensed moisture from the plurality of reservoirs 747. The plurality of reservoirs 747 may be blocked by a gate 748 actuatable This may facilitate precise ballast control. The number of the plurality of reservoirs 747 released may be predetermined based on sensitivity of the aerostat 702 to ballast for a given application, as smaller quantities of ballast may be needed for different missions. Further, or instead, one or more of the plurality of reservoirs 747 may be lined with a hydrophobic material. Additionally, or alternatively, the container may include a highly conductive material (e.g., carbon fiber or aluminum). One or more wires 750 may heat the container 746 to facilitate releasing ice from the plurality of reservoirs 747 in cold conditions. In certain implementations, the plurality of reservoirs 747 may also, or instead, have draft surfaces to increase the likelihood of separating the water in the plurality of reservoirs 747 from the container 746 when the gate 748 opens. Additionally, or alternatively, the gate 748 may be piezo actuatable and/or magnetically held in place by permanent magnets. The gate 748 may include a compliant sealing surface against the container 746 to create a water-tight seal.

Figures 8A, 8B:
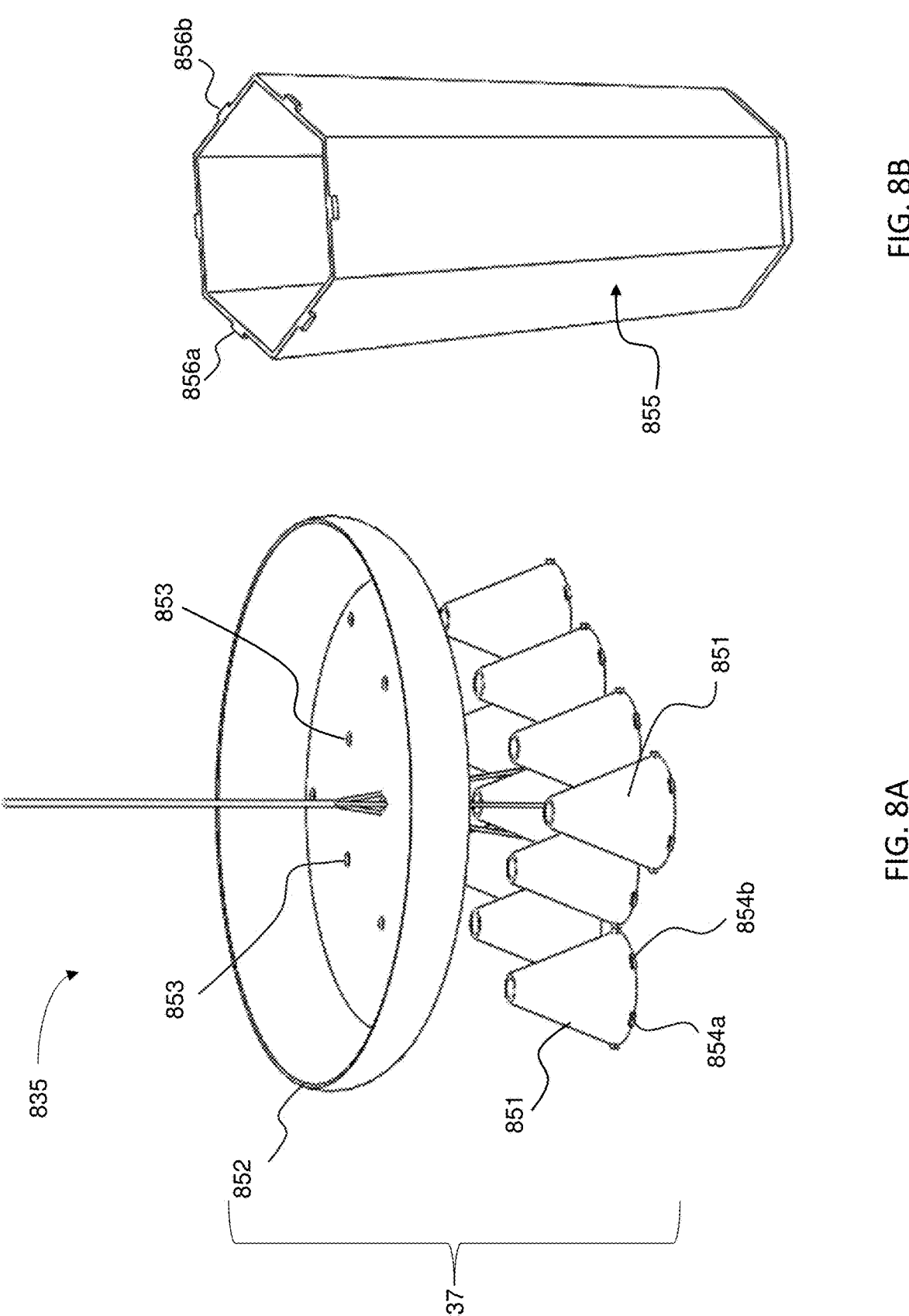
FIG. 8A is perspective view of a buoyancy control device attachable to a valve, with the buoyancy control device including a basin and a plurality of conical hydrophobic containers actuatable to release water to control ballast.
FIG. 8B is a perspective view of a hexagonal container of a buoyancy control device.
Figures 9A, 9B, 9C:
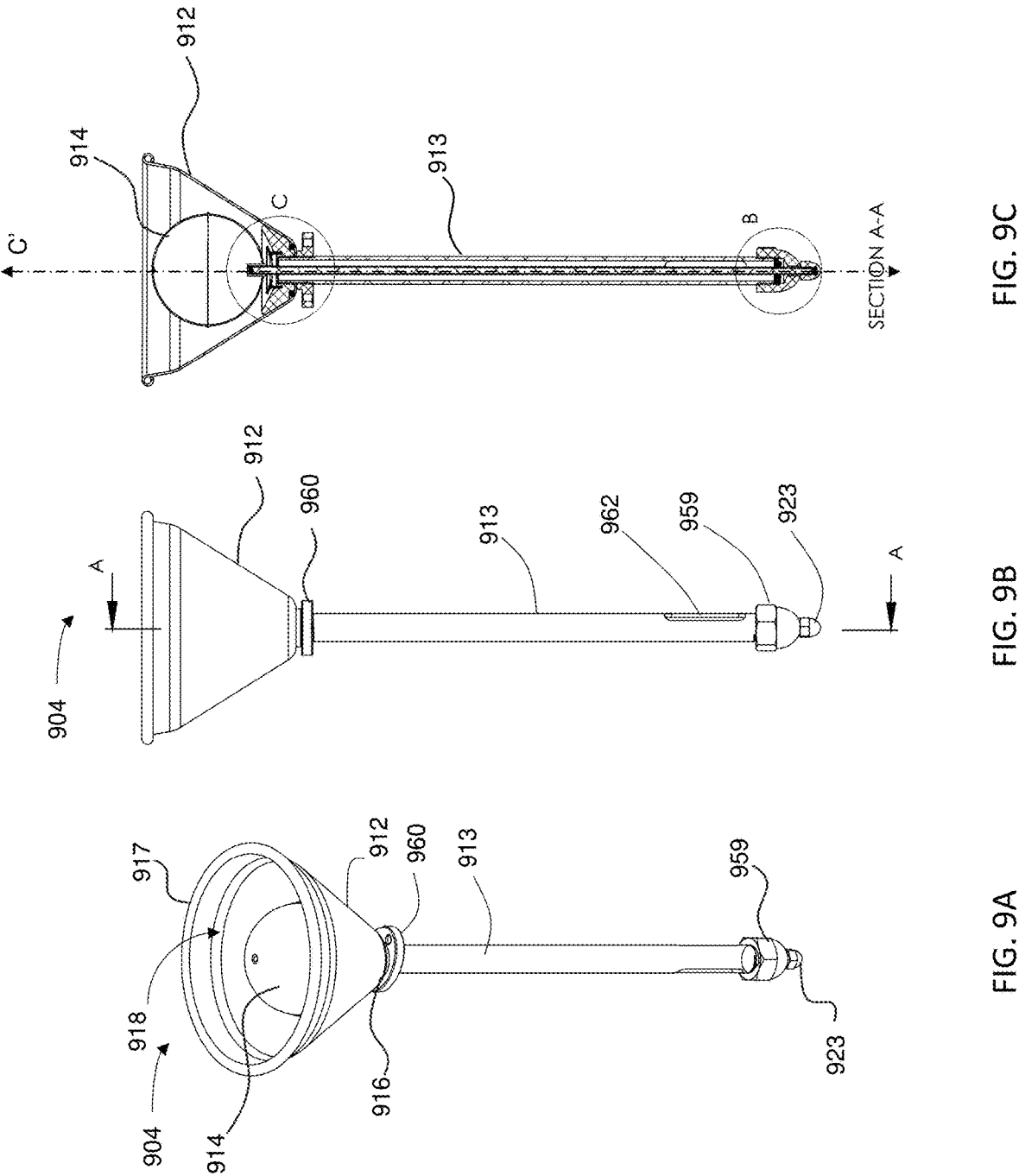
FIG. 9A is an isometric view of a valve including a T-shaped seal.
FIG. 9B is a side view of the valve of FIG. 9A shown with the valve in an open position.
FIG. 9C is a side view of cross-section of the valve of FIG. 9B, with the cross-section taken along A-A in FIG. 9B.
Figures 10A, 10B:
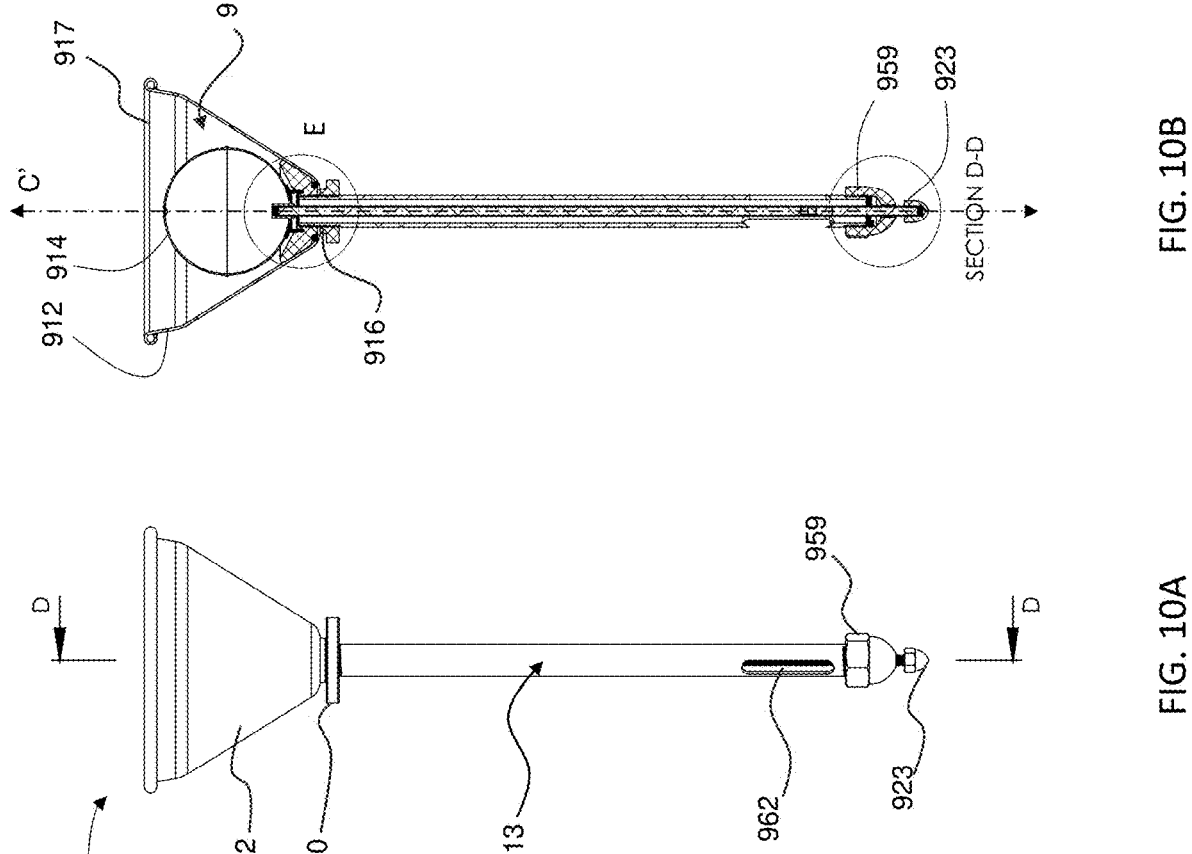
FIG. 10A is a side view of the valve of FIG. 9A, shown with the valve in a closed position.
FIG. 10B is a side view of a cross-section of the valve of FIG. 10A, with the cross-section taken along D-D in FIG. 10A.
Figures 11A, 11B, 12A, 12B:
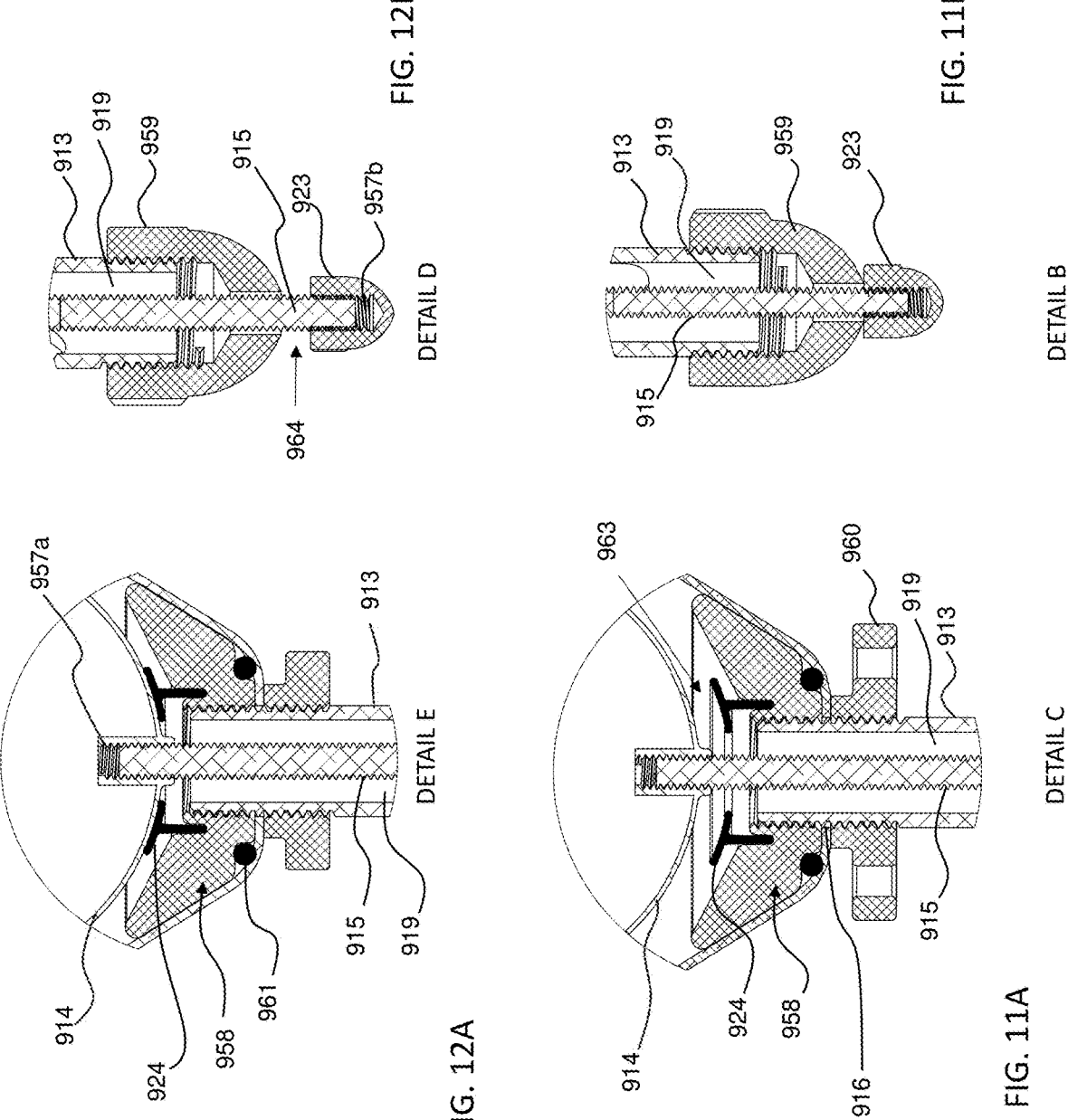
FIG. 11A is a side view of a cross-section along area of detail C of FIG. 9C.
FIG. 11B is a side view of a cross-section along area of detail B of FIG. 9C.
FIG. 12A is a side view of a cross section along area of detail E of FIG. 10B.
FIG. 12B is a side view of a cross section along area of detail D of FIG. 10B.
Figures 13A, 13B, 13C, 13D, 13E:
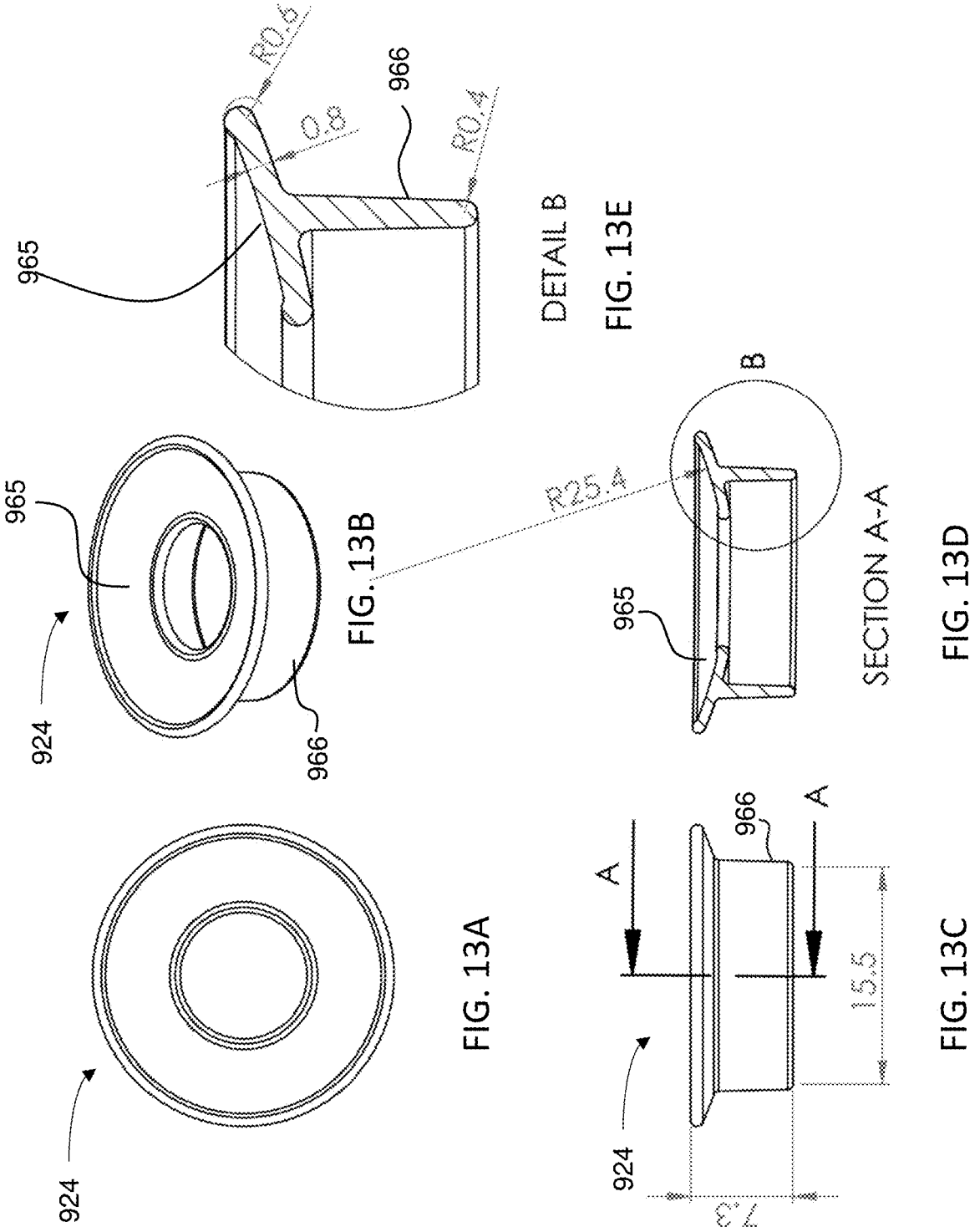
FIG. 13A is a top view of the T-shaped seal of FIG. 9A.
FIG. 13B is a perspective view of the T-shaped seal of FIG. 13A.
FIG. 13C is a side view of the T-shaped seal of FIG. 13A.
FIG. 13D is a side cross-sectional view of the T-shaped seal of FIG. 13A, with the cross-section taken along A-A in FIG. 13C.
FIG. 13E is an enlarged, side cross-sectional view of area of detail B in FIG. 13D.

As another example, referring now to FIG. 8A, a ballast controller 835 may include a receptacle 837 including a plurality of conical reservoirs 851. The bottom of each of the plurality of conical reservoirs 851 may be covered by a releasable membrane. The plurality of conical reservoirs 851 may become filled as condensate drains from a valve (e.g., any one or more of the valves described herein) into a basin 852 defining a plurality of openings 853, and moisture flows into the plurality of conical reservoirs 851 via the openings 853 of the basin 852. The releasable membrane may peel away when an electric current heats a wire to break the respective seal at the bottom of one or more of the conical reservoirs 851.

While ice may be released from each one of the plurality of conical reservoirs 851 in some implementations, it shall be appreciated that each one of the plurality of conical reservoirs 851 may be separable from one another such that each instance of the plurality of conical reservoirs 851 containing ice may be individually dropped. For example, to release one instance of the plurality of conical reservoirs 851, tab connections 854a,b may be wired (e.g., with a nichrome wire), and the wire may be heated to ignite a propellant that has been wax dipped to water seal it. The propellant may burn through the tabs 854a,b. Two instances of the tabs 854a,b be burned through to drop outermost masses first. Each one of the tabs 854a,b may constrain the respective instance of the plurality of conical reservoirs 851 until the wire is burned away. The tabs 854a,b may be run across a large number of the plurality of conical reservoirs 851 to increase resolution of ballast control in case only small amounts of ballast are needed to be dropped at a time, thus increasing flight duration and flexibility.

While the plurality of reservoirs may be conical in some instances, it shall be appreciated that other shapes are additionally, or alternatively, possible. For example, referring now to FIG. 8B, a reservoir 855 may be hexagonal with tabs 856a,b. A plurality of instances of the reservoir 855 may be molded at once and propellant may be added at connection points formed by the tabs 856a,b. In certain implementations, wiring used to trigger the propellant may be introduced integral with the molding process. Further, or instead, wires for controlling the release may be in electrical communication with a controller.

While certain aspects of valves have been described, other implementations are additionally, or alternatively, possible.

For example, referring now to FIGS. 9A-9C, 10A-10B, 11A-11B, 12A-12B, and 13A-13E a valve 904 may include a funnel 912, a stem 913, a stopper 914, a rod 915, and a seal 924. The funnel 912 may define a first opening 916, a second opening 917, and a cavity 918 therebetween. The stem 913 may define a channel 919, the stopper 914 may be disposed in the cavity 918, and the rod 915 may be coupled to the stopper 914 and at least partially disposed in the channel 919. The stem 913 may be connected to the funnel 912 either directly via a welded joint, or via a spaced block that the stem 913 may be screwed into or glued into to facilitate concentrically aligning the stem 913 with the funnel 912 itself.

The funnel 912 may be spun-formed from aluminum sheet or die cast. The stem 913 may include threads 957a,b on each end. For example, the stem 913 may be ½" OD×⅜" ID aluminum tube, and the threads 957a at the top of the stem 913 may be ½-20 threads to mate with a cone-shaped insert 958 that holds the seal 924. In certain instances, an acorn nut 959 may be coupled to a lower end portion of the stem 913, and the retainer 923 may define a clearance hole through which the rod 915 may extend, and the rod 915 may be threaded into the stopper 914. A retainer 923 may be coupled to the rod 915 to limit upward travel of the stopper 914 in a direction away from the first opening 916. The stopper 914 is shown raised above the of the seal 924 in FIG. 11A, with the seal 924 having a T-shaped solid of revolution about a center axis C' defined by the rod 915.

A threaded oval washer 960 may define holes for attachment of a tether (e.g., any one or more of the tethers described herein). The stem 913 may be threaded into the cone-shaped insert 958 such that the funnel 912 may be squeezed between the threaded oval washer 960 and the cone-shaped insert 958. A soft silicone O-ring 961 may be disposed between the cone-shaped insert 958 and the funnel 912 to create a gas-tight seal, even as temperatures vary from steam to freezing. The cone-shaped insert 958 may be silicone seal adhered in place and/or epoxied in some implementations.

The stem 913 may define openings 962 to facilitate draining condensed moisture out of the stem 913 after the condensed moisture level in the inflatable structure raises the stopper 914 and the water from the inflatable structure flows past the seal 924 to move down the stem 913 and through the openings 962. Water may additionally, or alternatively, drain through the clearance between the rod 915 and the clearance hole defined by the acorn nut 959. However, the clearance hole of the acorn nut 959 may be a loose fit to guide the rod 915 and maintain the stopper 914 substantially centered such that most of the water flow drains from the stem 913 via the openings 962.

With the retainer 923 in contact with the acorn nut 959, a first gap 963 is defined between the stopper 914 and the seal 924, with the gap 963 limited (e.g., to about ¼ inch) by contact between the retainer 923 and the acorn nut 959. With the stopper 914 in contact with the seal 924, a second gap 169b is defined between the retainer 923 and the acorn nut 959.

The seal 924 includes projection upwards of the outermost diameter of the seal 924 and the diameter of the stopper 914 defines a volume that represents the maximum buoyancy of the seal 924. This buoyancy must be greater than the mass of the stopper 914, the rod 915, and the retainer 923 (the moving mass of the stopper 914 and attached hardware).

The volume can be calculated by determining the angle phi from the center of the stopper 914 of diameter D to the outer diameter d of the seal 924:

$$phi=A\ \mathrm{SIN}(d/D)$$

Using an integral, the volume can be found to be:

$$V=2*PI(\ )(D/2)\char94 3*(1/12*(-\mathrm{COS}(3*phi)+9*\mathrm{COS}$$
$$(phi))-(\mathrm{SIN}(phi))\char94 2*PI(\ )2+phi*(\mathrm{SIN}(phi))\char94 2)$$

The seal 924 may include a seal seat 965 having a rounded concave curvature to match the curvature of the stopper 914 to provide a line or area contact seal, thus reducing the likelihood of unintended gas and water flow out of an aerostat. Ends of the seal seat 965 may contain rounded features of diameter slightly larger than the thickness of the seal seat 965 to help contact the float and create lines of contact, thus reducing the chance that dirt may compromise the quality of the seal. Multiple such seal bumps may be incorporated.

The seal seat 965 may be at the end of a thin flexible member 966 about 0.8 mm in thickness and about 6 mm tall. The thin flexible member 966 may fit into a groove in a conical seat. Silicone rubber sealant or another adhesive may be placed in the groove prior to the thin flexible member 966 being inserted. The diameter of the seal 924 may be about 10 mm wide to 25 mm wide.

The amount of steam that may enter the balloon may contain enough initial lift to launch the balloon upwards with twice the buoyancy of just hydrogen. However, if the steam condenses and the water is not released, the balloon may settle back to ground. Accordingly, the float valve used to release such condensation may reduce the likelihood of the balloon settling back to the ground prematurely. Additionally, or alternatively, the float valve may capture enough of the condensed water to serve as ballast for controlling altitude of the balloon. However, advantageously, the ballast does not have to be initially brought aloft by lift associated solely with hydrogen and so, under otherwise identical conditions, less hydrogen is required to accomplish a given mission. The ballast may be filled as water condenses while the balloon is on ground level to facilitate filling the ballast device properly before the balloon achieves positive buoyancy and floats away.

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

Embodiments disclosed herein may include computer program products comprising computer-executable code or computer-usable code that, when executing on one or more computing devices, performs any and/or all of the steps of the control systems described above. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another aspect, any of the control systems described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of the disclosure.

What is claimed is:

1. An aerostat comprising:
   an inflatable structure including a balloon and a neck collectively defining a volume;
   a valve including
      a funnel supportable in the neck and defining a first opening, a second opening, and a cavity therebetween, the cavity in fluid communication with the volume via the second opening,
      a stem defining a channel at least partially outside of the inflatable structure,
      a stopper disposed in the cavity,
      a rod coupled to the stopper, at least one portion of the rod formed of a ferromagnetic material; and an actuator including a metal coil disposed about the rod and electrically actuatable to move the rod in an axial direction relative to the channel such that the stopper moves relative to the first opening of the cavity to control fluid communication between the volume and the channel via the cavity.

2. The aerostat of claim 1, wherein the valve is normally-closed with the stopper restricting flow through the first opening of the cavity, and the actuator is electrically actuatable to move the stopper away from the first opening of the cavity to establish fluid communication between the volume of the inflatable structure and the channel of the stem via the cavity of the funnel.

3. The aerostat of claim 1, wherein, with the actuator deactivated, the stopper restricts fluid communication between the first opening and the volume of the inflatable structure via the second opening.

4. The aerostat of claim 1, wherein the axial direction is defined from the first opening of the funnel toward the second opening of the funnel.

5. The aerostat of claim 1, wherein the metal coil circumscribes at least a portion of the funnel with the funnel supported in the neck of the inflatable structure.

6. The aerostat of claim 1, wherein the actuator includes a motor mechanically coupled to the rod, and the motor is electrically actuatable to move the rod relative to the channel such that the stopper moves relative to the first opening of the cavity to control fluid communication between the volume of the inflatable structure and the channel of the stem via the cavity of the funnel.

7. The aerostat of claim 6, wherein the motor is mechanically coupled to the rod via a coupling, the coupling is flexible, and the motor is electrically actuatable to transmit tension to the coupling.

8. The aerostat of claim 6, further comprising a payload, wherein the payload is mechanically coupled to the motor, and the weight of the payload exerting tension on the motor with the inflatable structure in flight.

9. The aerostat of claim 6, further comprising a spring, wherein force of the spring biases the stopper toward the first opening to restrict flow through the first opening, and the actuator is electrically actuatable to move the stopper, via movement of the rod, in a direction opposite the force of the spring.

10. The aerostat of claim 1, wherein the rod is elongate, and the stopper is symmetric about any plane including a center axis defined along a longitudinal dimension of the rod.

11. The aerostat of claim 10, wherein the stopper is spherical, ovoid, or conical.

12. The aerostat of claim 1, wherein the stem defines one or more openings outside of the volume of the inflatable structure, and the one or more openings are in fluid communication with the channel of the stem.

13. The aerostat of claim 1, wherein the valve further includes a retainer, the rod has a first end portion and a second end portion, the stopper is supported on the first end portion of the rod in the cavity of the funnel, the second end portion of the rod extends outside of the channel, the retainer is coupled to the second end portion of the rod, and the retainer is engageable with the stem to limit axial movement of the rod in a direction toward the cavity of the funnel.

14. The aerostat of claim 1, wherein the valve further includes a seal supported by the funnel, the seal is disposed in the cavity of the funnel, the seal defines an orifice in fluid communication with the first opening of the cavity, and the stopper is seatable on the seal to form a flow restriction therebetween in response to a change in electrical activation of the actuator.

15. The aerostat of claim 14, wherein the seal has a concave shape matching curvature of the stopper.

16. The aerostat of claim 14, wherein the seal is a T-shaped solid of revolution about a center axis defined by the rod.

17. The aerostat of claim 1, further comprising a controller configured to receive a signal indicative of flight of the inflatable structure and, based on the signal, to electrically actuate the actuator to move the rod relative to the channel such that the stopper moves relative to the first opening of the cavity to control fluid communication between the volume and the channel via the cavity.

18. The aerostat of claim 17, wherein the signal indicative of flight conditions of the inflatable structure includes a change in altitude of the inflatable structure.

* * * * *